United States Patent
Takahashi et al.

(10) Patent No.: US 7,184,212 B2
(45) Date of Patent: Feb. 27, 2007

(54) OBSERVATION APPARATUS

(75) Inventors: Susumu Takahashi, Iruma (JP); Kazuo Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/361,631

(22) Filed: Feb. 11, 2003

(65) Prior Publication Data

US 2003/0151809 A1 Aug. 14, 2003

(30) Foreign Application Priority Data

Feb. 12, 2002 (JP) ............................. 2002-034222

(51) Int. Cl.
- G02B 27/22 (2006.01)
- H04N 7/18 (2006.01)
- H04N 5/14 (2006.01)

(52) U.S. Cl. ........................ 359/462; 359/457; 348/77; 348/744

(58) Field of Classification Search ................. 359/15, 359/462, 464, 463, 456, 460, 443, 446, 452, 359/457, 458; 353/10, 79, 69, 119, 7, 50; 128/849; 348/77, 65, 54, 744; 600/103; 385/147

See application file for complete search history.

(56) References Cited

U.S. PATENT DOCUMENTS

| | | | |
|---|---|---|---|
| 4,340,198 A * | 7/1982 | Meinunger | 248/122.1 |
| 4,984,871 A * | 1/1991 | Martinez | 359/443 |
| 5,526,146 A * | 6/1996 | Goodman et al. | 349/5 |
| 6,023,289 A * | 2/2000 | Oravecz et al. | 348/77 |
| 6,095,652 A * | 8/2000 | Trayner et al. | 353/10 |
| 6,179,426 B1 * | 1/2001 | Rodriguez et al. | 353/69 |
| 6,266,476 B1 * | 7/2001 | Shie et al. | 385/147 |
| 6,612,310 B2 * | 9/2003 | Sklar | 128/849 |
| 6,752,498 B2 * | 6/2004 | Covannon et al. | 351/240 |

FOREIGN PATENT DOCUMENTS

| | | | |
|---|---|---|---|
| FR | 2634045 A * | 1/1990 | |
| JP | S51-24116 | 2/1976 | |

* cited by examiner

Primary Examiner—Audrey Chang
(74) Attorney, Agent, or Firm—Arnold International; Bruce Y. Arnold

(57) ABSTRACT

An observation apparatus is disclosed that includes two projection devices, a display panel, and a retaining and supporting member. The two projection devices are each provided with an aperture, and are positioned and oriented so that images are projected onto the display panel through the apertures. The display panel either includes a pupil-forming optical system that is formed of an image-forming element having positive optical power that is integral to the display panel or is sufficiently nearby it such that conjugate positions of the projection apertures are formed at pupil positions for observation. The retaining and supporting member is provided with a retaining mechanism that enables the display panel to be detachably attached to the supporting member.

10 Claims, 30 Drawing Sheets

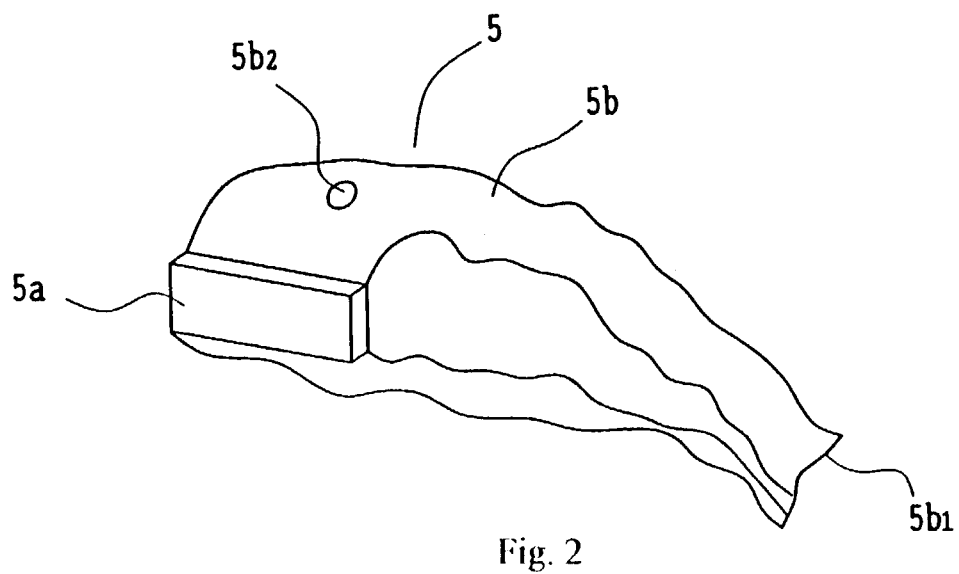
Fig. 2
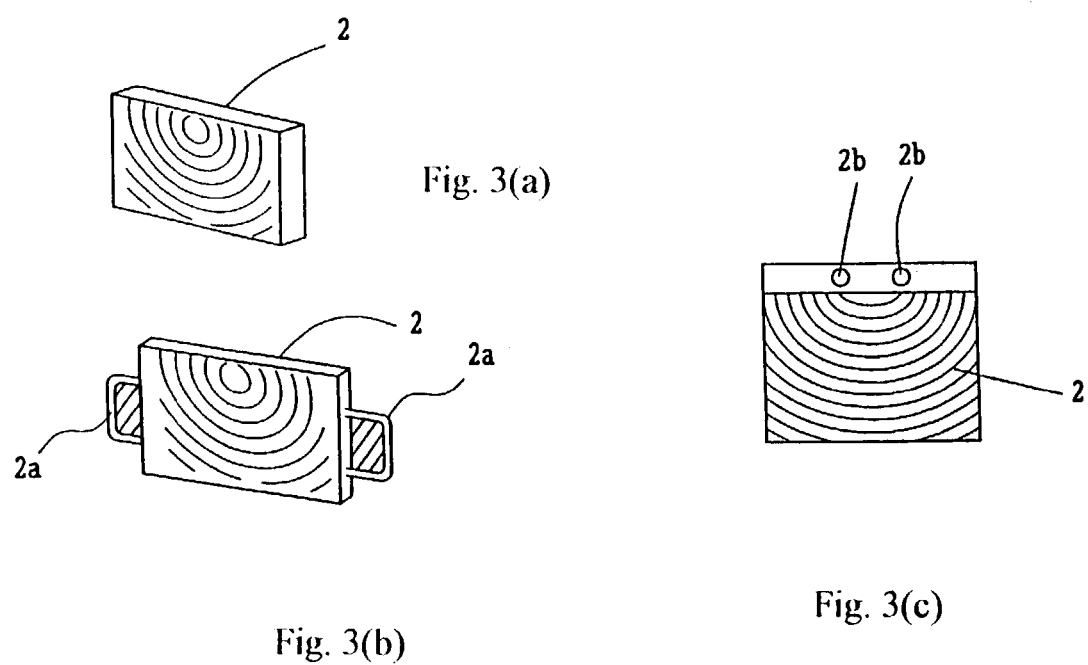
Fig. 3(a)
Fig. 3(b)
Fig. 3(c)

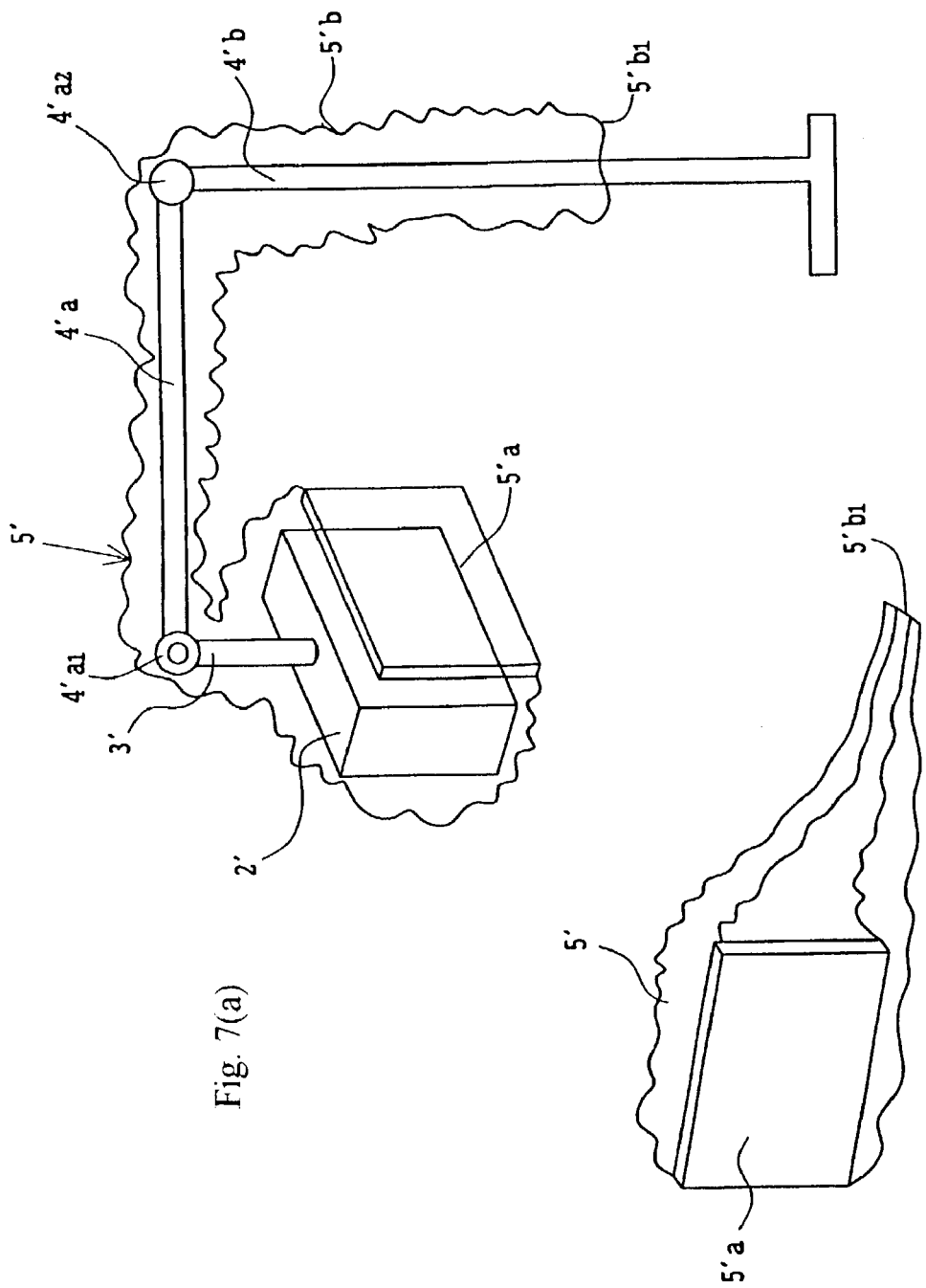

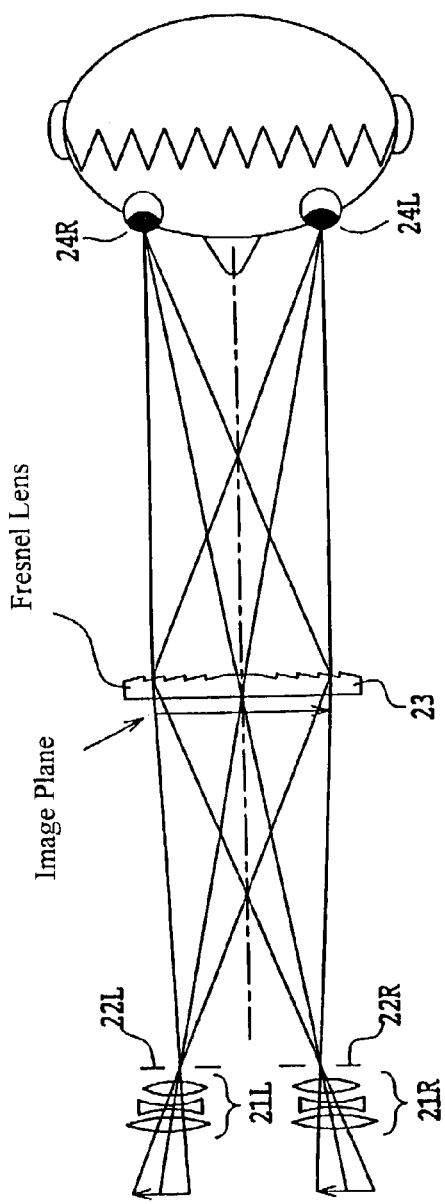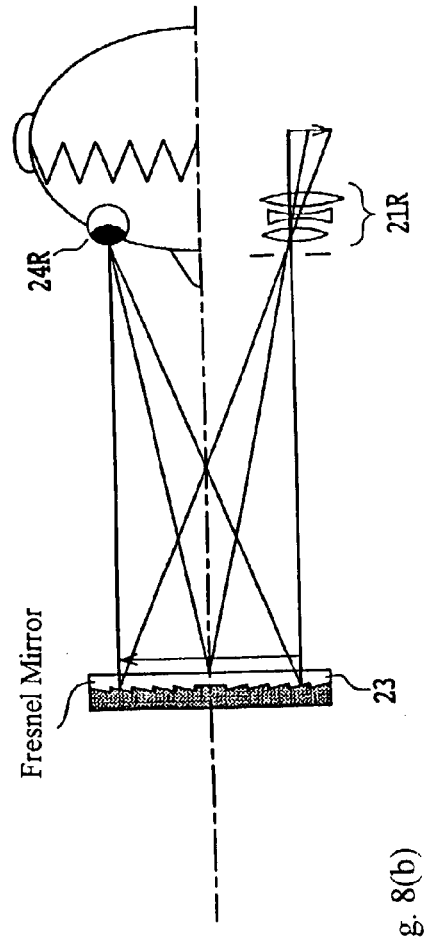
Fig. 8(a)
Fig. 8(b)

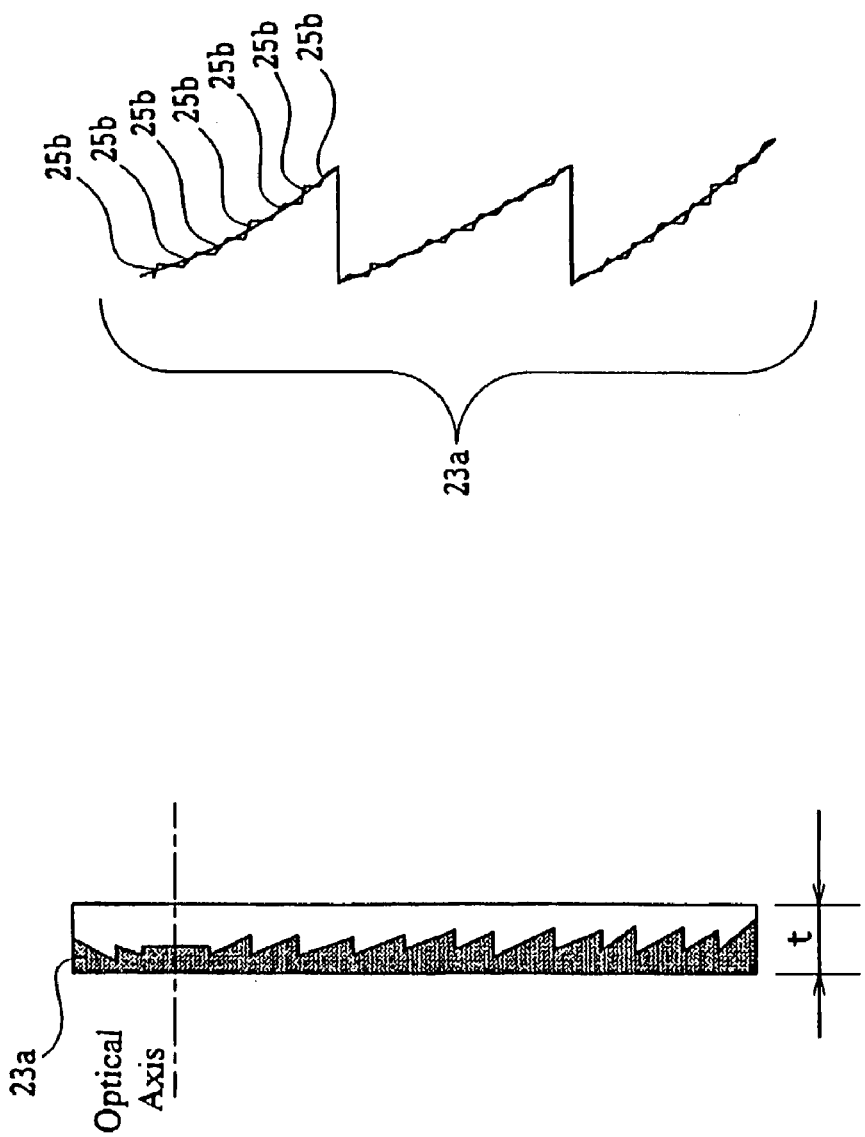

OBSERVATION APPARATUS

CROSS REFERENCE TO RELATED APPLICATION

This application is a related in subject matter to applicants' U.S. application Ser. No. 10/270,641 filed Oct. 16, 2002, entitled "Three-Dimensional Observation Apparatus". Also, this application claims the benefit of foreign priority from Japanese Patent Application No. 2002-034222, filed Feb. 12, 2002, the contents of which are hereby incorporated by reference.

BACKGROUND OF THE INVENTION

The present invention relates to an observation apparatus for use in an operating room to observe two-dimensional (hereinafter 2-D), three-dimensional (hereinafter 3-D), or both 2-D and 3-D images of endoscopic surgery without requiring the observer to wear special glasses in order to experience 3-D images.

Conventionally, the area to be operated on is imaged onto an image sensor that is positioned within a camera of an endoscope or, during detailed surgery, within a surgical microscope. The image data is then displayed as an enlarged image on an image display device, which can be either a 2-D or a 3-D display device. Surgeons routinely perform surgery while observing such display images.

FIG. 32 is a conceptual diagram illustrating the positional relationship between a surgeon, a patient and an image display device in a conventional operating room. In FIG. 32, 51 is a patient, 52 is an operating table, 53 is the main surgeon performing an operation, $54_1$ to $54_3$ are assistant surgeons, and 55 is an image display device. The operating room 56 is divided into a clean area 56a which is free of bacteria (within the area enclosed by the dashed line) and an unclean area 56b wherein a certain degree of bacterial contamination is allowed (the area surrounding the clean area 56a). The clean area 56a includes a predetermined space surrounding the surgeons 53, and $54_1$ to $54_3$, who perform surgery while standing or sitting at the periphery of the operating table 52 on which the patient 51 is lying. Sterilization procedures are performed on the operating table 52 and other equipment in order to prevent invasion of saprophytic bacteria into the patient 51. The surgeons 53, and $54_1$ to $54_3$ enter into the clean area clothed in operating gowns which have been sterilized and they then perform the surgery.

The image display device 55 includes electronic circuitry and optical members that are nearly impossible to make bacteria-free because they cannot be subjected to sterilization procedures such as high temperature/high pressure sterilization (autoclave) procedures or gamma-ray irradiation sterilization, etc., without damaging the electronic circuitry and the optical members. Therefore, these items must be positioned within the area where bacteria are allowed (i.e., the unclean area). Thus, the main surgeon is required to observe the displayed images from a position that is separated from the actual operating area, the position of the image display device 55 cannot easily be changed, and the surgery is difficult and tiresome because the observation positions are limited. Furthermore, by increasing the size of the image display device 55 in order to achieve easier observation from a distant position, the entire image display device 55 becomes larger, which not only increases the cost of the equipment but also causes the larger image display device to become an obstruction and to unnecessarily consume operating room space, which itself is an expensive commodity.

BRIEF SUMMARY OF THE INVENTION

The present invention will first be discussed in general terms which apply to both embodiments of the invention, which is an observation apparatus for use in an operating room and that can display, for example, 3-D images of a surgical procedure on a display device that can be positioned within the clean area of the operating room. Thus, the display device can be positioned within reach of the surgeons during an operation, thereby enabling the display surface of the display device to be smaller since it is viewed from nearby positions. Having the display device within reach of the surgeons enables it to be readily adjusted to accommodate a variety of viewing positions during the operation, thereby making the surgery easier and less tiresome to the surgeons. Furthermore, the present invention is an observation apparatus which allows the viewer to experience 3-D images without requiring the viewer to wear special glasses.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 2 shows a drape used in the observation apparatus shown in FIG. 1;

FIGS. 3(a)–3(c) show other examples of reflective display panels that may be used to display projected images using the observation apparatus shown in FIG. 1;

FIG. 7(a) shows a second embodiment of an observation apparatus according to the present invention, which employs a self-luminous display device that may be positioned within the clean area and adjusted in position during surgery;

FIG. 7(b) is an explanatory drawing of a drape member 5' of FIG. 7(a);

FIGS. 8(a) and 8(b) illustrate the arrangement of components of a projection-type, stereoscopic observation device, with FIG. 8(a) showing the arrangement where the display panel thereof is transmissive, and FIG. 8(b) showing the arrangement where the display panel thereof is reflective;

FIGS. 16(a) and 16(b) relate to another example of a reflective display panel that may be used in an observation apparatus according to the invention which employs a reflective display panel arrangement, with FIG. 16(a) being a side view, and FIG. 16(b) being an enlarged view of a portion shown in FIG. 16(a);

DETAILED DESCRIPTION

Figure 1:
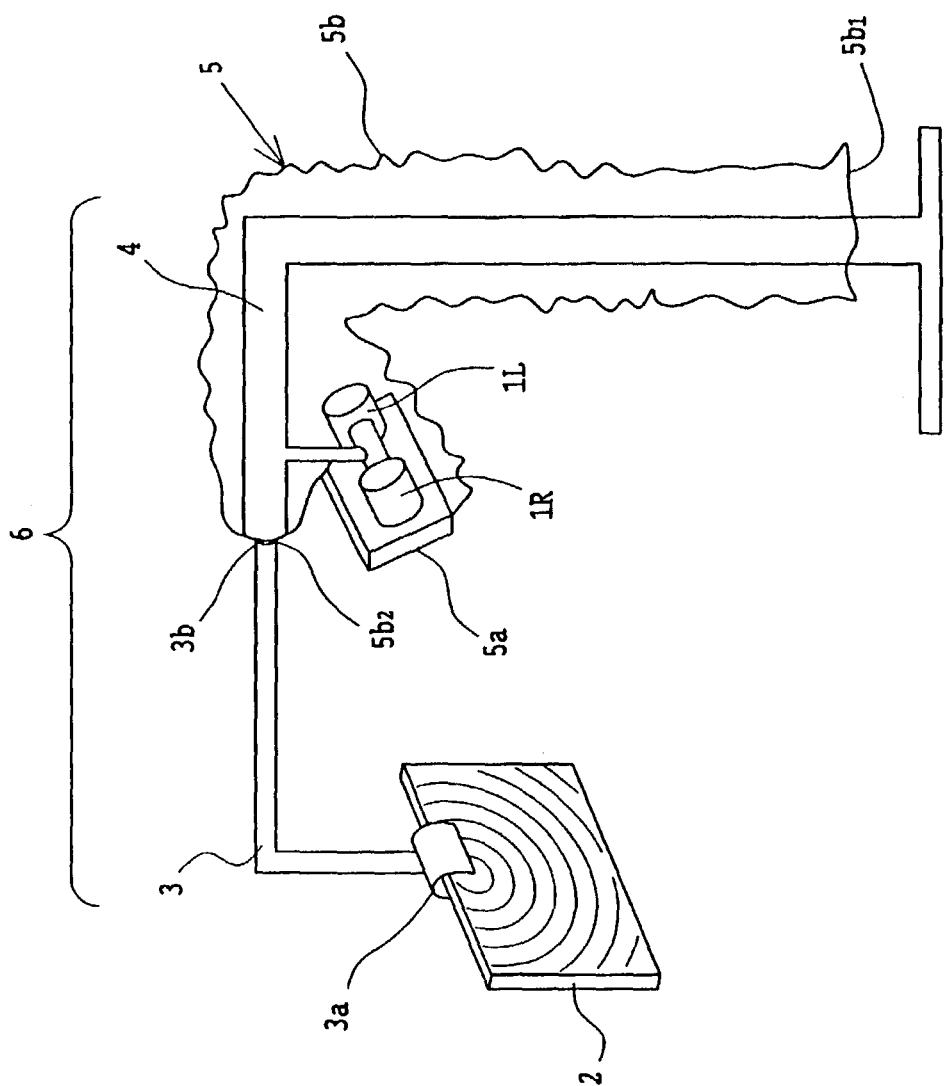
FIG. 1 shows a first embodiment of an observation apparatus of the present invention that uses a reflective display panel that is illuminated by projectors.

The observation apparatus according to a first embodiment of the present invention is provided with projection devices for projecting images onto the same, flat or slightly curved, surface of a display panel from two apertures; an image-forming element for forming images of the two apertures for observation at pupil positions, the image-forming element being positioned at, or in proximity to, the surface of the display panel; and a retaining and supporting member for retaining and supporting the display panel. Preferably, the retaining and supporting member also supports the projection devices and is configured such that the display panel is detachably attachable to the retaining and supporting member via a retainer mechanism. Also, preferably, the retainer mechanism is capable of being sterilized.

The operation of the observation apparatus according to the first embodiment of the present invention will now be described. Because, in this embodiment, the display panel is detachably attachable to the retaining and supporting member, a sterilized display panel can be used for each surgery by switching to a new, sterilized display panel just prior to beginning each surgery. Moreover, a sterilized retainer mechanism can also be used for each surgery by sterilizing the retainer mechanism before each surgery, as a result of the retainer mechanism itself being detachably attachable to the supporting member. Furthermore, saprophytic bacteria can be prevented from exuding to the exterior of the projection device because the projection device is configured so as to be covered with a drape that includes a transparent optical member having a size sufficient to cover the aperture member of the projection device, and thus the exterior of the projection device can be kept sterilized by using a sterilized drape which forms the exterior of the projection device. Thus, according to the present invention, the display panel can be positioned within the clean area in the vicinity of the operating region of the patient because the exterior surfaces associated with the observation apparatus within the clean area are sterilized. As a result, the display image can be more easily observed and the surgeons themselves can more easily change the position of the observation apparatus so as to enable a different posture to be assumed. This makes the surgery easier and reduces fatigue.

A display panel that provides a 3-D observation or a 2-D observation can be selectively attached to the observation apparatus of the present invention, since the display panel is detachably attachable to the retaining member. As a result, the display panel can be switched by selecting 3-D image observation for viewing by the main surgeon alone or by selecting 2-D image observation for viewing by a plurality of surgeons.

In the observation apparatus according to the present invention, the display panel can be repositioned at will without contaminating the display surface with saprophytic bacteria because holding members, such as a knob, a handle, etc., allow the display device to be grasped without contacting the display surface itself. The holding members may be provided, for example, at the left and right sides of the display panel.

In the observation apparatus of the present invention, the display panel can be prevented from falling due to an unexpected impact such as might be experienced during an earthquake, even when positioned above the surgical area, because means to prevent unintentional release of the display panel from the retaining mechanism are provided. Thus, surgery can be performed in a safe environment.

According to a second embodiment of the present invention, the observation apparatus includes a display device, a retaining and supporting member for retaining and supporting the display device, and a drape that includes a transparent plate. The display device and at least portions of the retaining and supporting member are configured so that they may be covered with the drape while permitting the display surface of the display device to be viewed through the transparent plate of the drape.

According to Embodiment 1 of the present invention, the observation apparatus includes a projection device for projecting images onto a display surface from two apertures, and observation pupil formation means form images of these two apertures at observation pupils. An observer is able to view 3-D images projected onto a display panel of the observation apparatus by placing his left and right eyes at the left and right observation pupils, respectively.

According to the observation apparatus of one embodiment of the present invention, by configuring the left and right projection images such that an image is formed at the same display surface position, the axial positions of the left and right pupils of the observer are aligned so that the viewing paths intersect at the image displayed on the display surface. This is the same phenomena as occurs in natural observation. Therefore the user has a quite natural feeling when observing, and this serves to reduce his fatigue. Also, the degree of freedom in positioning an observer may be increased by forming enlarged images of the two apertures at the pupil positions for observation. As a result, the observer can observe in more comfortable postures, and even change his posture while continuously observing the display.

When observation pupil enlarging means, such as a diffusive element, are provided at the display surface position, the pupils of the projection device can be smaller than when no enlarging means is provided. Thus, the image quality of the projection device can be maintained while reducing the size of the projection device. This is helpful in reducing the cost of the projection device and, especially where a reflective display panel is provided, helps reduce interference between the head of the observer and the projection device. Also, adverse effects resulting from differences in the luminous flux intensities and aberrations from the projection device are nullified by providing an enlarging means at the display surface. That is, the luminous flux can be made more uniform by the diffusive effect of the observation pupil enlarging means being located at the display surface and this enables the observer to observe display images without distortion so long as his eyes are positioned at the observation pupils.

According to the observation apparatus of one embodiment, the image quality does not deteriorate even if a Fresnel lens or a Fresnel mirror serves as the observation pupil formation means. Also, image quality does not deteriorate if a pupil enlarging effect is provided using various light diffusive means, so long as the diffusive means is formed at or very near the Fresnel lens or Fresnel mirror surface.

According to a another feature of the observation apparatus of one embodiment of the present invention, compactness is achieved using a single, flat or slightly curved, display panel and by positioning an imaging means for forming the observation pupils and a diffusive means for enlarging these observation pupils at or near the display panel surface. Marked deterioration of image quality can be controlled even when the display panel is configured so as to be tilted.

FIG. 1 shows a first embodiment of an observation apparatus of the present invention that uses a reflective display panel that is illuminated by projectors which provide a stereoscopic view to an observer. This embodiment includes projection devices 1R and 1L, a display panel 2, a retaining and supporting member 6, and a drape 5. The retaining and supporting member 6 is formed of a retaining member 3 and a supporting member 4. The projection devices 1R and 1L are configured such that right and left images are projected onto a display panel 2 so as to form a 3-D display. The display panel 2 is provided with observation pupil forming means (not shown) for forming images of the respective apertures of the projection devices 1R and 1L. These images are the exit pupils, i.e., the location where display images can be viewed by the observer placing his eyes at the exit pupils.

The retaining member 3 is formed of a material that can be sterilized, and is provided with a clamp 3a at one end. The clamp holds the display panel 2 in place in a detachable manner, and the other end 3b of the retaining member 3 is attached to the supporting member 4 in a detachable manner. The supporting member 4 supports the projection devices 1R and 1L and also supports the retaining member 3 that holds the clamp 3a. The drape 5 is sterilized and covers the projection devices 1R and 1L, as well as the supporting member 4.

FIG. 2 shows a drape used in the observation apparatus shown in FIG. 1. The drape 5 includes a transparent plate 5a formed of transparent plastic or glass of a size sufficient to simultaneously cover the two apertures of the projection devices 1R and 1L, a bag-shaped cover 5b for covering the projection devices 1R and 1L, and the supporting member 4. The bag-shaped cover 5b is open at one end $5b_1$. A hole $5b_2$ is provided in one portion to allow the retaining member 3 to pass through when attaching the retaining member 3 to the supporting member 4.

FIGS. 3(a)–3(c) show other examples of reflective display panels that may be used with the observation apparatus shown in FIG. 1. The display panel 2 shown in FIG. 3(a)

comprises a plastic plate that may be slightly curved and is provided with a Fresnel surface, for example, that is positioned so that images are projected onto the Fresnel surface. Further, the display panel 2 is detachable from the retaining member 3 shown in FIG. 1, and may be disposed of or may be reused after sterilization. The display panel 2 shown in FIG. 3(b) is provided with knobs 2a and 2a on the left and right sides of the display surface of the display panel 2 in FIG. 3(a). The position of the display panel 2 can be controlled and the display panel 2 is detachable from the retaining member 3 without touching the display surface by providing the display panel 2 with the configuration shown in FIG. 3(b). The display panel 2 shown in FIG. 3(c) is provided with holes 2b and 2b in the upper portion to prevent falling. It should be noted that, when using the display panel 2 configured as shown in FIG. 3(c), the clamp 3a is configured with positive retaining means (such as pins, rods, bolts, or screws) to prevent unintended release of the display panel, by one or more of these items being passed through the holes 2b and 2b. By using the display panel 2 and the retaining member 3 configured in such a manner, the display panel 2 can be supported in air with open space surrounding the display panel and can be prevented from falling from the clamp 3a, even if the display panel 2 were to receive some sort of impact while the display panel 2 is attached to the retaining member 3. The Fresnel surface is eccentric in the display panels shown in FIGS. 3(a)–3(c). The display panel is preferably provided with diffusive means to enlarge the exit pupils, as will be discussed in detail later with reference to FIG. 9.

Figure 4:
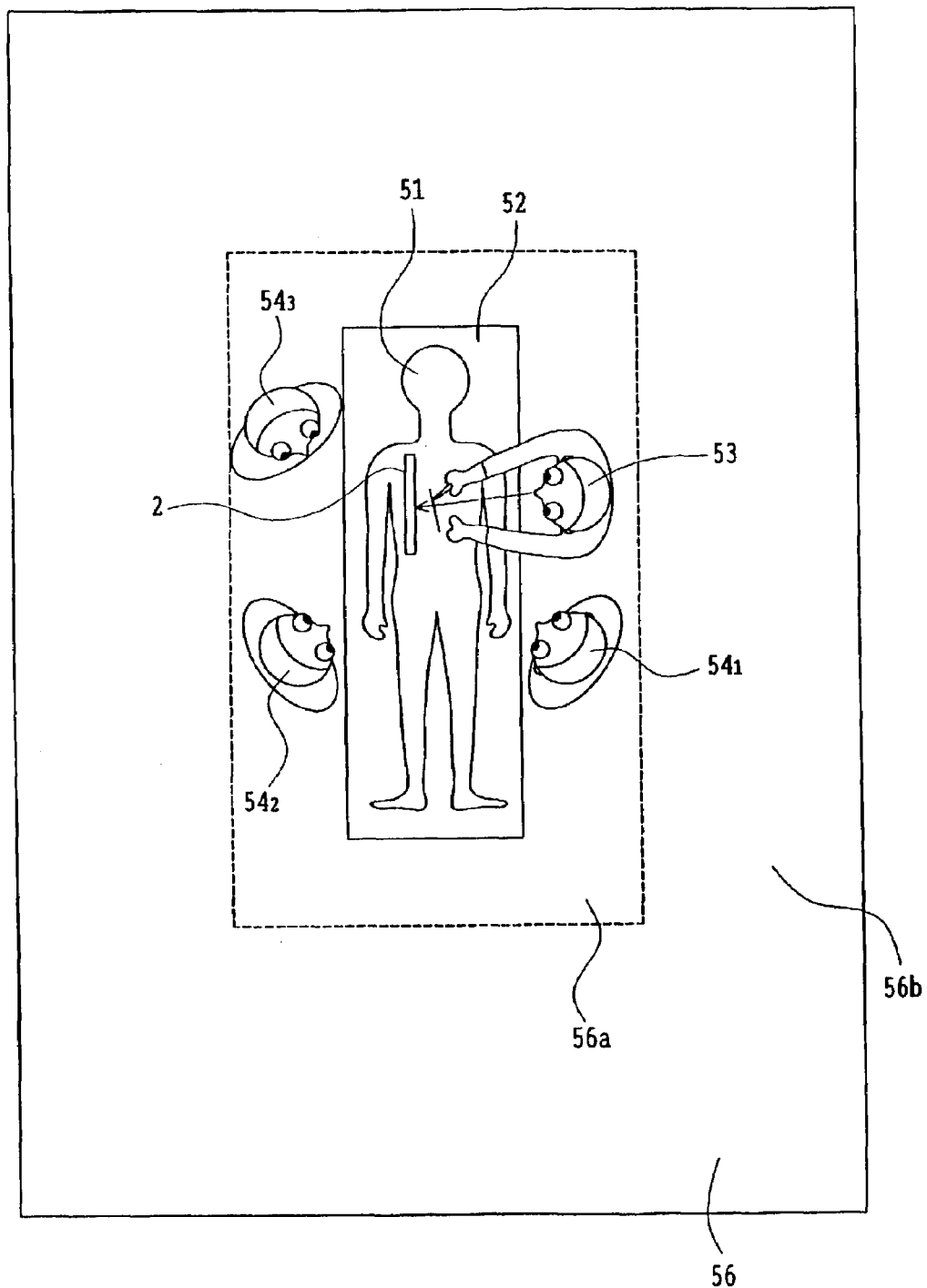
FIG. 4 shows the positional relationship between the image display device, the surgeon, the assistant surgeons, and the patient in an operating room when surgery is performed using the observation apparatus shown in FIG. 1.

FIG. 4 shows the positional relationship between an image display panel, the surgeon and the assistant surgeons, and the patient in an operating room where surgery is performed using the observation apparatus embodiment shown in FIG. 1. In this figure, a patient 51, lying on an operating table 52 is operated on by a main surgeon 53 who is assisted by the assistant surgeons $54_1$ to $54_3$. It should also be mentioned that the other components of an observation apparatus of the present invention, other than the display panel portion shown in FIG. 4 in block diagram, have been omitted from FIG. 4.

According to the observation apparatus of Embodiment 1 of the present invention, a sterilized display panel 2 can be readily provided by exchanging the display panel 2 for a new, sterilized, display panel 2 before each surgery. The retaining member 3 is made of a material which is capable of being sterilized and is detachable from the supporting member 4, so a sterilized retaining member can be used for each surgery by sterilizing the retaining member 3 before each surgery.

In this case, the position of the display panel 2 can be controlled and the display panel 2 is detachable from the retaining member without touching the display surface by providing the display panel 2 with a configuration shown in FIG. 3(b). By using the display panel 2 and the retaining member 3 configured in the manner described in FIG. 3(c), the display panel 2 can be prevented from falling from the clamp 3a even if the display panel 2 were to receive some sort of impact after the display panel 2 has been attached to the retaining member 3. As a result, surgery can be performed with safety assured even when the display panel 2 is positioned above the surgical area.

Because the display panel 2 is detachable from the retaining member, the display panel 2 may be switched depending on whether 3-D observation or 2-D observation is intended. Thus, 3-D image observation by the main surgeon 53 alone or 2-D image observation by a plurality of assistant surgeons $54_1$ to $54_3$ may be selected. As described above, an exchangeable display panel is used in Embodiment 1 of the present invention which may be either reusable or disposable so long as a sterile display panel is provided.

According to the observation apparatus of Embodiment 2 of the present invention, saprophytic bacteria can be prevented from escaping to the exterior of the display device by covering the display device with a sterilized drape having a transparent optical member of sufficient size to allow the display device to be viewed through the transparent optical member. Thus, according to this embodiment, the display images are easy to observe because the display device 2 can be positioned in the vicinity of the operation area of the patient 51, i.e., within the clean area 56a. Surgery is also easier because the position of the observation device can easily be changed by the main surgeon 53.

Figure 5:
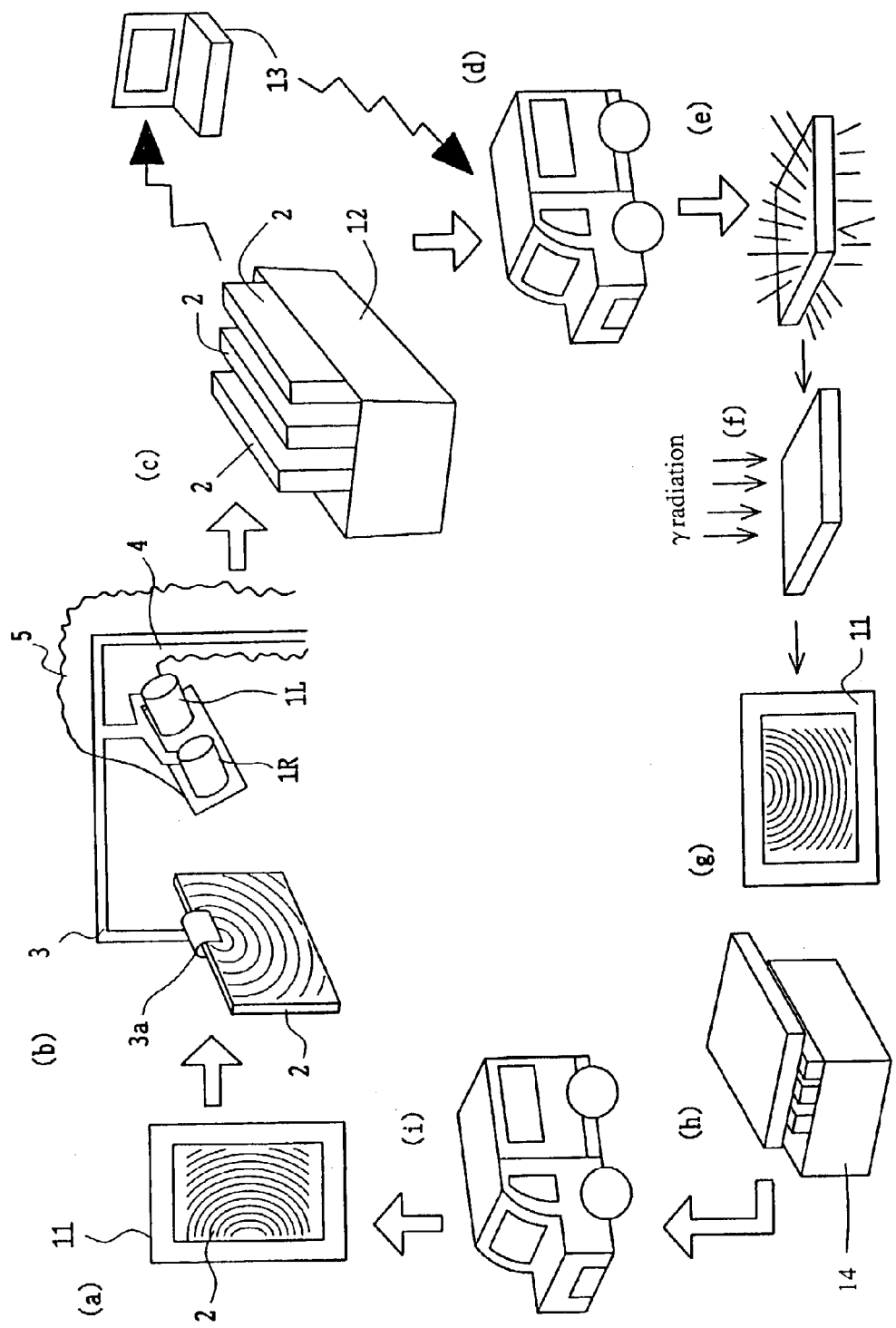
FIG. 5 is an explanatory drawing that illustrates processing procedures (a)–(i) of a recycling system when an exchangeable display panel that may be used with embodiments of the invention that employ a projection of images onto the display device is configured so as to be reusable.

FIG. 5 is an explanatory drawing that illustrates processing procedures (a)–(i) of a recycling system when an exchangeable display panel is configured so as to be reusable. The display panel 2 is sealed (procedure (a)) in a pack 11 in a sterilized condition. This is unsealed within the clean area of the operating room, and is then attached (procedure (b)) to the observation apparatus using a retaining member 3. After the display panel has been used during surgery, the display panel 2 is removed from the retaining member 3 and stored (procedure (c)) in a used display panel storage container 12. The used display panel storage container 12 is provided with a sensor (not shown) for counting the number of panels, and is configured so as to be capable of transmitting the detected panel count to a computer terminal 13 that is positioned at a reprocessing facility via wired or wireless transmitting means. The used panel count data is obtained for each surgical facility by operating computer terminal 13 at a reprocessing facility. Then, the used panels are collected (procedure (d)) and an equal number of sterilized display panels are delivered (procedure (i)) to the surgical facility. The used display panels which have been collected are then transported to a reprocessing facility. At the reprocessing facility, the used display panels are washed, rinsed in distilled water, and then dried (procedure (e)). The display panels are subsequently sterilized using γ radiation (procedure (f)). The sterilized display panels are then sealed in sterile packs 11 (procedure (g)), so as to safeguard them in a sterile state until they are unsealed. The sterilized and sealed display panels are then stored in a transport container 14 (procedure (h)). A predetermined number of sterilized display panels are then transported to the surgical facility (procedure (i)), and the used display panels are simultaneously collected, as discussed above. The display panels are made reusable by repeating this procedure.

Resources can be used effectively by using such a reprocessing system. Moreover, the required number of sterilized display panels is immediately available because the used display panels can be ascertained in real time at the reprocessing facility. In a recycling system such as that shown in FIG. 5, an example of the process from cleaning and drying to γ radiation sterilization, in the case that the display panels are provided with a diffusive film.

Figure 6:
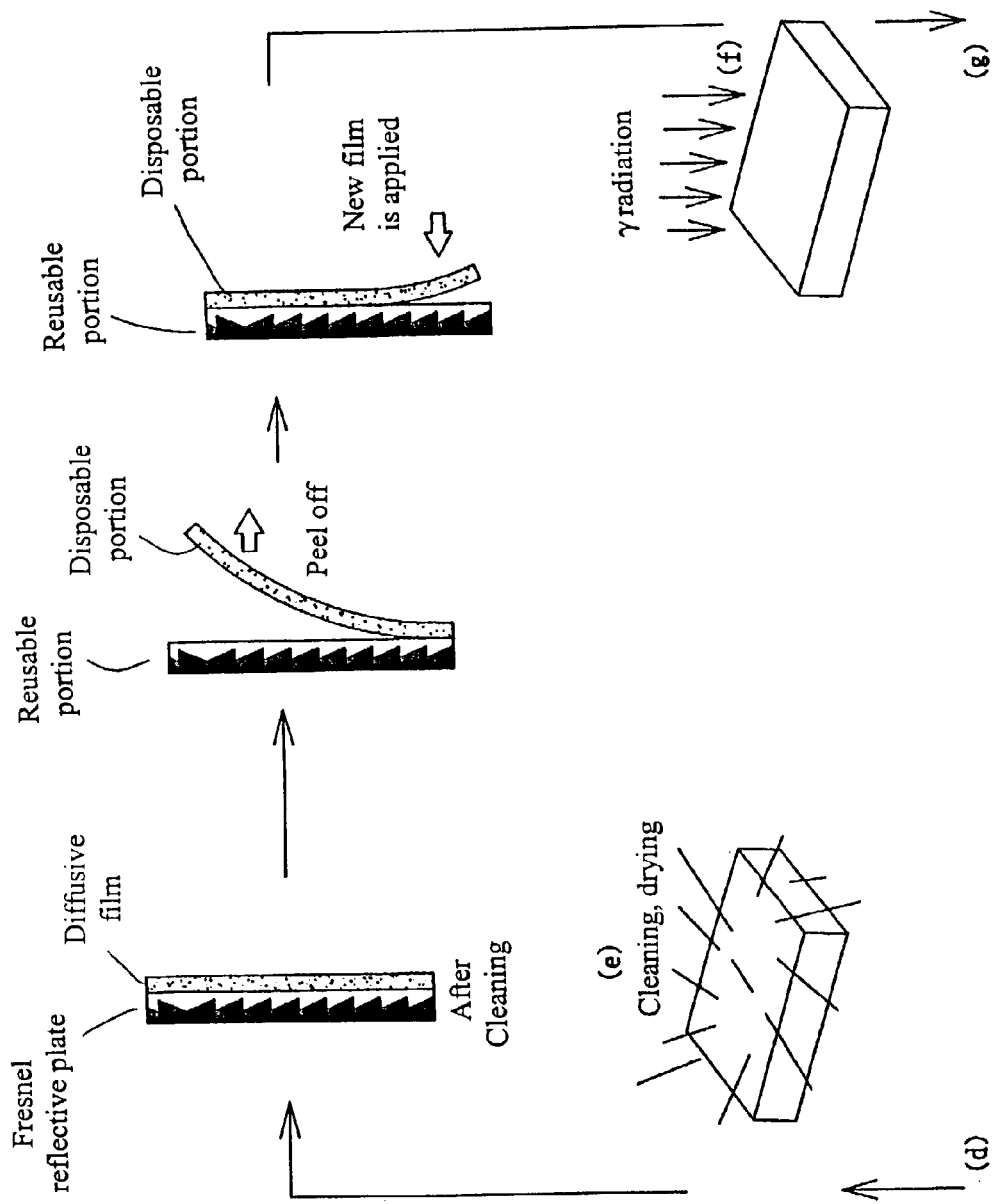
FIG. 6 is an explanatory drawing that illustrates alternative processing procedures between procedures (e) and (f), namely, from cleaning and drying, to γ radiation sterilization, of a recyclable display panel that is provided with a diffusive film.

FIG. 6 is an explanatory drawing that illustrates additional processing which may be performed between procedures (e) and (f), namely, between cleaning and drying and γ radiation sterilization, of a recyclable display panel that is provided with a diffusive film. The display panels of the present example are formed of a Fresnel reflective plate that is made of a durable material and capable of reuse (the reusable portion), and a diffusive film which is a material of relatively poor durability that is not suitable for reuse (the disposable portion). After cleaning and drying (procedure (e)), the diffusive film is removed from the Fresnel reflective plate, a new film is positioned thereon, and γ radiation sterilization is performed (procedure (f)). The disposable portion is the film layer, which is inexpensive and easily replaced.

FIG. 7(a) shows a second embodiment of an observation apparatus according to the present invention, and FIG. 7(b) is an explanatory drawing of the drape member 5' shown in FIG. 7(a). The observation apparatus of this embodiment includes a prior art, self-luminous, lenticular 3-D display device 2', a retaining member 3', supporting members 4'a and 4'b, and a drape 5'. The drape 5' is formed of a transparent plate 5'a attached at its periphery to a bag-shaped cover 5'b. It should be noted that in FIGS. 7(a) and 7(b), 5'$b_1$ is an opening. The prior art display device 2' in this embodiment is not illuminated by projectors as in Embodiment 1, but instead displays its images according to display data that it receives from picture image inputs obtained from sources such as an endoscope camera, microscope camera or a personal computer. These inputs may be 2-D, 3-D or both 2-D and 3-D. The display device 2' in this embodiment is retained by retaining member 3'. The retaining member 3' is supported in a rotatable configuration by a supporting member 4'a via a joint member 4'$a_1$, and the supporting member 4'a is supported in a rotatable configuration by a supporting member 4'b via a joint member 4'$a_2$. The lenticular display device 2' has a thin, light configuration. However, the observation apparatus of the present embodiment is different from the observation apparatus shown in FIG. 1. The display device 2' of Embodiment 2 is not detachable from the retaining member 3', and the retaining member 3' is not detachable from the supporting member 4'a. Moreover, the display device 2' is self-luminous and cannot be sterilized because it is provided with an internal light source. In the present embodiment, the display surface of the 3-D display device 2' is covered by a transparent plate 5'a using the drape 5' that is provided with the large transparent plate 5'a. The retaining member 3', the supporting members 4'a and 4'b, and the portions other than the display surface of the 3-D display device 2' are covered by the bag-shaped cover 5'b. According to the observation apparatus of this embodiment, 3-D images can be observed while preventing the escape of saprophytic bacteria outside of the drape 5'.

Next, a preferred configuration for the display panel portion and the projection devices of the observation apparatus shown in FIG. 1 of the present invention will be described. The configuration of the drape 5 and the detachable configuration of the display panel have been omitted from the description below, but the configuration in FIG. 1 nevertheless applies.

FIG. 8(a) is a schematic diagram showing a transparent stereoscopic observation device, and FIG. 8(b) is a schematic diagram showing a reflective stereoscopic observation device. It should be noted that only the configuration for the right eye is shown in FIG. 8(b), with the configuration for the left eye having been omitted, for convenience of illustration. The stereoscopic observation devices shown in FIGS. 8(a) and 8(b) each employ projection optical systems 21L and 21R, and an observation pupil forming optical system 23. Although not shown in FIG. 8(a) or 8(b), a diffusive means, as will be discussed in detail later, may be attached or included in the Fresnel lens shown in FIG. 8(a) or in the Fresnel mirror shown in FIG. 8(b). The projection optical systems 21L and 21R are positioned and oriented such that images from the two apertures 22L and 22R are projected onto the same display surface region. The observation pupil forming optical system 23 is positioned such that the apertures 22L and 22R of the projection optical system form images at observation pupils which can then be observed by the observer placing his left and right eyes at observation pupils 24L and 24R. A diffusive means operates to enlarge these observation pupils. The observation pupil forming optical system 23 and the diffusive means are positioned at or very near the image plane of the projectors.

The display surface position is the image plane of the images projected from the projection device. In a transmissive observation apparatus that uses projectors, a Fresnel lens serves as the observation pupil forming optical system 23 that is positioned at the image plane; in a reflective observation apparatus, a Fresnel mirror serves as the observation pupil forming optical system 23. The Fresnel lens and the Fresnel mirror are positioned such that the apertures 22L, 22R of the projectors are imaged at exit pupil positions where an observer my observe the images formed on the display surface. The image quality of these Fresnel surfaces is not deteriorated because the Fresnel surfaces are positioned at the image plane of the projected images.

Figure 9:
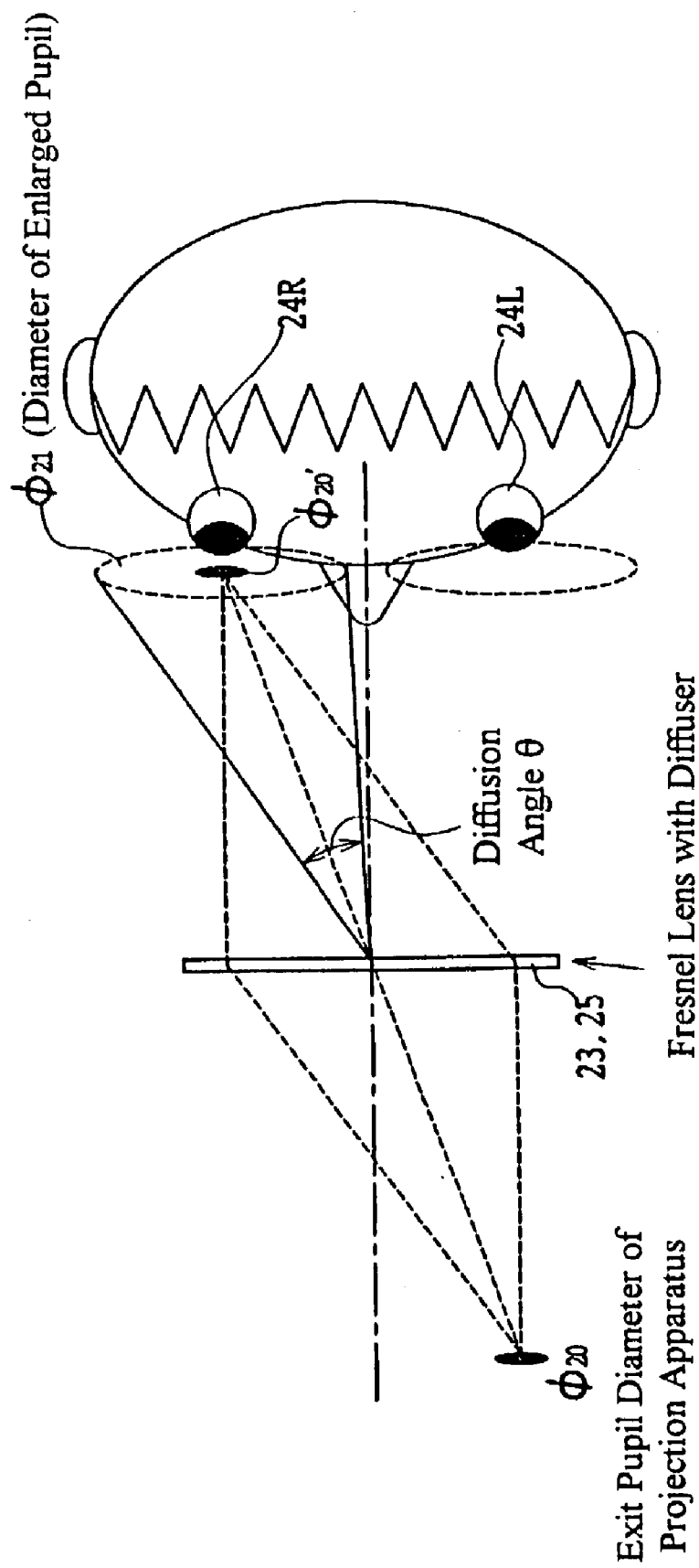
FIG. 9 illustrates how the observation pupils may be enlarged using a diffuser, this technique being applicable not only when a transmissive display panel is used (as illustrated), but also when a reflective display panel is used (not illustrated in this figure)

FIG. 9 is an explanatory drawing showing the basic principles used for enlarging the pupils for observation of the stereoscopic observation apparatus according to the present invention. FIG. 9, for purposes of illustration, uses a transparent panel configuration of a stereoscopic observation apparatus, however, the operation is somewhat similar for a reflective configuration. As mentioned previously, a diffusive optical system 25 is positioned, along with the observation pupil forming optical system, at or in the vicinity of, the image plane of the projectors. The observation pupil forming optical system 23 in FIG. 9 has the effect of forming images in space of the left and right projection devices. These images in space comprise exit pupils for observation having a diameter $\phi_{20'}$. The diffusive optical system 25 enlarges the diameter of the pupils for observation from $\phi_{20'}$ to $\phi_{21}$. The left and right pupils for observation enlarged by the diffusive optical system 25 are positioned so as to not overlap at the observation position in order to prevent cross-talk among the left verses right stereo pair images. The diffusive effect of the diffusive optical system 25 occurs only once in a transparent stereoscopic observation apparatus because the projection light passes through the diffusive optical system 25 that is positioned at the display surface position only once. On the other hand, in a reflective stereoscopic observation apparatus, the diffusive effect occurs twice because the projection light passes through the diffusive optical system twice.

Figure 10A:
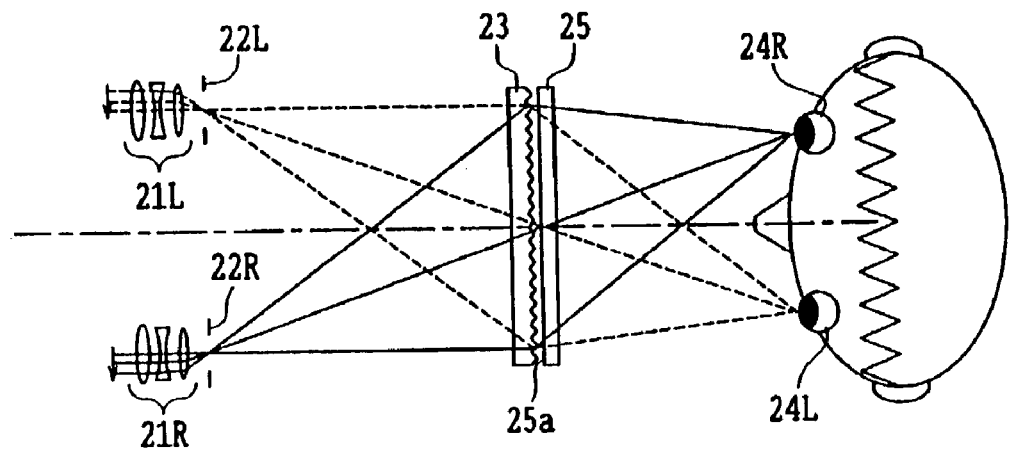
FIGS. 10(a) and 10(b) show the use of a transmissive display panel and a projection system, with FIG. 10(a) being a top view, and FIG. 10(b) being a side view.
Figure 10B:
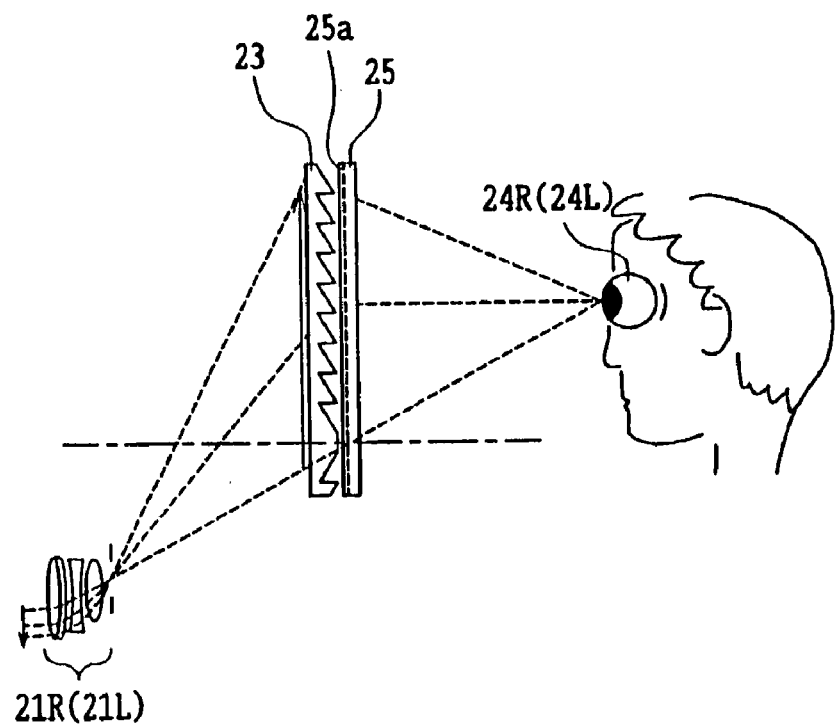

FIGS. 10(a) and 10(b) show the use of a transmissive display panel and projection system which is applicable to Embodiment 1 of the present invention, with FIG. 10(a) being a top view, and FIG. 10(b) being a side view. The stereoscopic observation device illustrated in these figures has a transmissive configuration. A Fresnel lens, serving as an observation pupil forming optical system 23 for imaging the apertures 22R and 22L at the observation pupils 24R and 24L, is positioned at the display surface position with the Fresnel surface thereof being on the observation pupil side. A light diffusive optical system 25 for enlarging the pupils is positioned in the vicinity of the Fresnel lens 23. The light diffusive optical system 25 includes a light diffusive surface 25a adjacent the prism-like surfaces of the Fresnel lens 23.

The Fresnel lens 23 is positioned at the image plane of the images projected from the projection devices 21L,21R. The image quality, therefore, is not degraded as a result of the Fresnel surface. The diffusive surface 25a is positioned in the immediate vicinity of the Fresnel surface so as to minimize blurring and thus maintain good image quality. In the present embodiment, the transparent display panel is an eccentric optical system. That is, the Fresnel surface in this case is an eccentric Fresnel lens surface, with the optical axis of the Fresnel surface being positioned below the center of the Fresnel lens surface, as shown in FIG. 10(b). It should be mentioned that the Fresnel surface has positive optical power. Because a Fresnel lens or Fresnel mirror is used for the Fresnel surface, the display panel itself does not increase in thickness when using an eccentric optical system to form the observation pupils. And, use of an eccentric optical system to form the observation pupils enables the display panel to be positioned with the projectors out of the line of sight to the display panel. It should also be noted that it is preferable to reduce image degradation by positioning the diffusive surface 25a and the Fresnel surface very near to the image plane of the projected images.

Figure 11A:
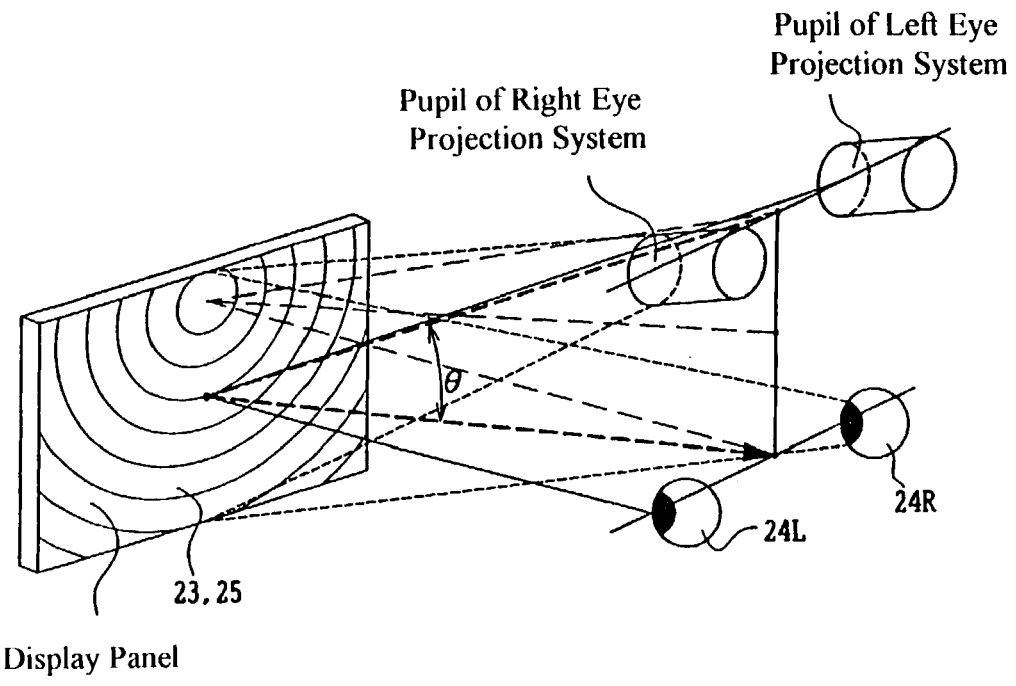
FIGS. 11(a) and 11(b) show the use of a reflective display panel and a projection system, with FIG. 11(a) being a perspective view of the display panel and FIG. 11(b) being a side view of the display panel.
Figure 11B:
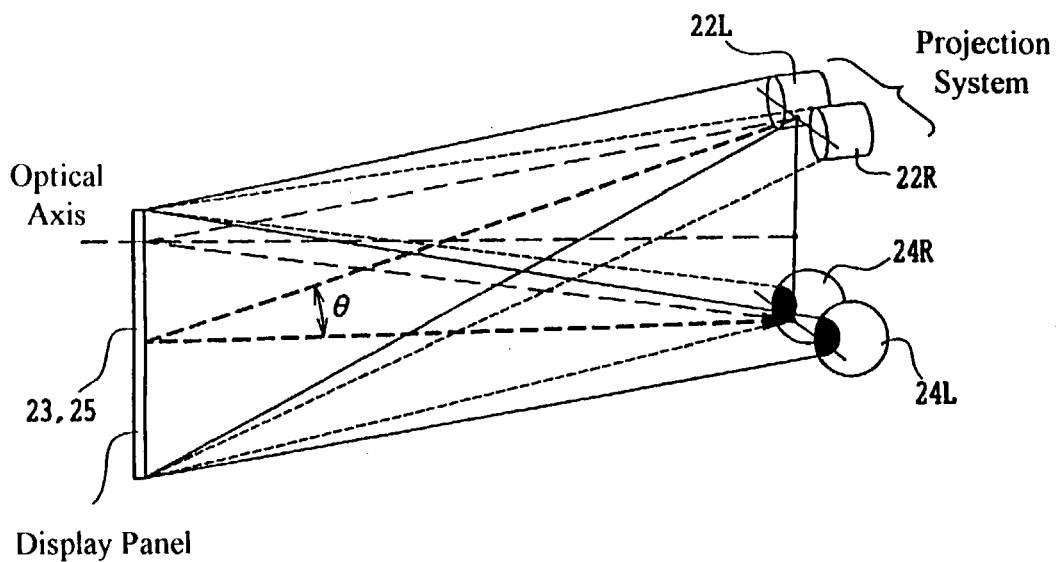

FIGS. 11(a) and 11(b) show another example of a stereoscopic observation device which is applicable to the present invention; with FIG. 11(a) being a perspective view and FIG. 11(b) being a side view. The stereoscopic observation device illustrated in these figures has a reflective-type configuration, and the display panel is provided with a Fresnel mirror 23 serving as the observation pupil forming optical system for forming images of the apertures 22R and 22L of the projection optical system at the observation pupils 24R and 24L (for viewing by an observer). The display panel also includes a diffusive optical system 25 for enlarging the exit pupils in a manner as discussed previously.

In the case of a reflective stereoscopic observation apparatus, each optical member must be positioned such that the projection device and the head of the observer do not interfere. The display panel is also more easily viewed by an observer from the front (i.e., in the reflective mode).

An angle θ is provided between the light ray of the projection light that is incident at the center of the display panel and the optical axis of the outgoing light ray from the center of the display panel. The optical axis of the Fresnel mirror 23 is made eccentric (above, in FIGS. 11(a) and 11(b)) relative to the center of the display panel.

Figure 12:
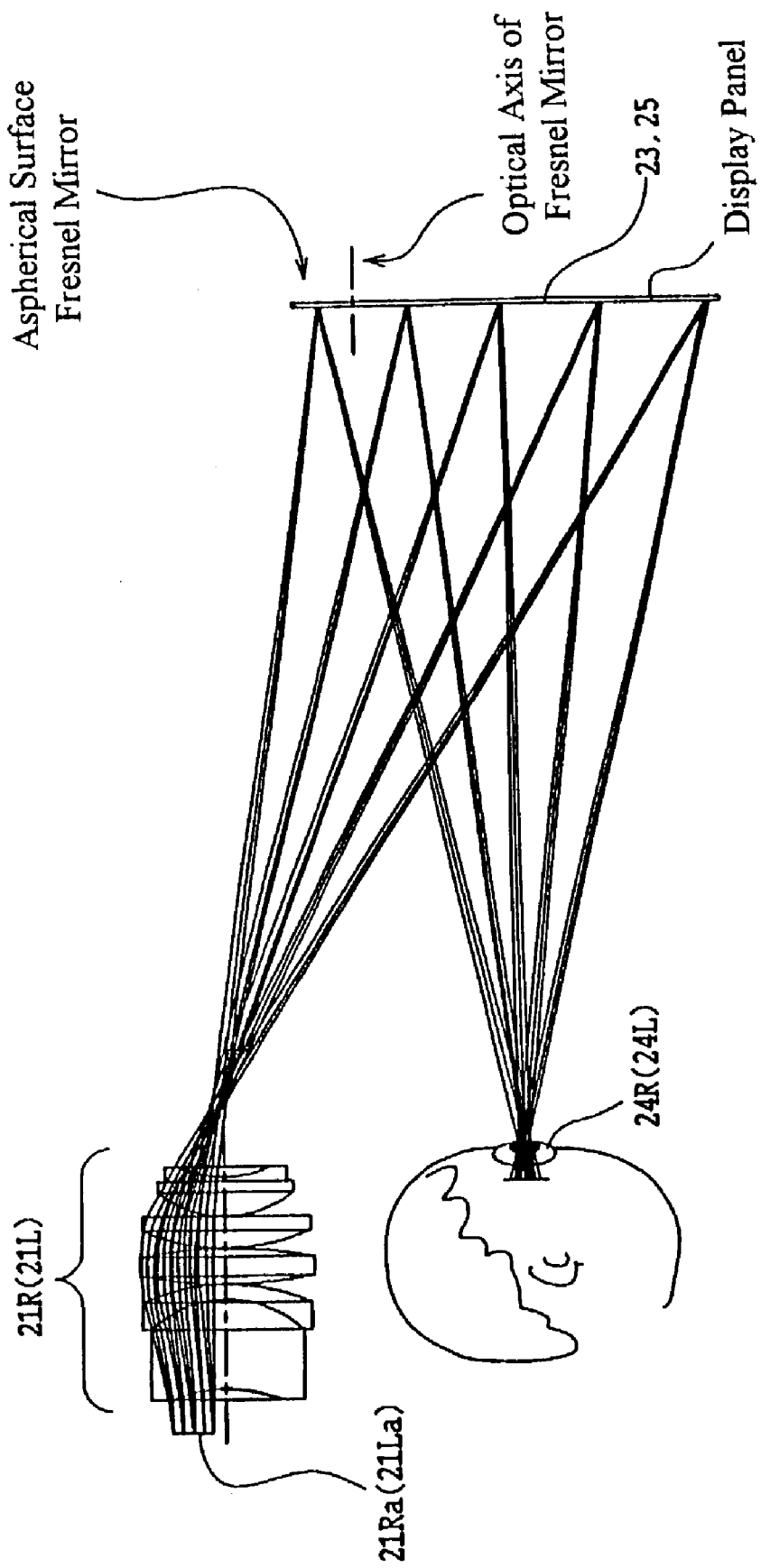
FIG. 12 is a side view of the reflective display panel and projection system of FIGS. 11(a) and 11(b) when in use, but as seen from the opposite side and in greater detail.

FIG. 12 is a side view showing an example of the display panel of FIGS. 11(a) and 11(b), but in greater detail. In FIG. 12, an aspheric lens system is used in the projection optical system 21R (21L), and the projection optical system is prevented from interfering with the position of the observer's head by having the display element surface 21Ra, (21La) in a position that is eccentric to the optical axis of the projection optical system 21R (21L). Further, the display panel normal is aligned with a line drawn mid-way between the eyes of the observer and the center of the display panel, and an aspheric Fresnel mirror forms the display panel surface.

As described above, the display panel is preferably configured so that the observer views the display panel with its normal aligned with the observer's line of sight to the center of the display panel. However, the display panel can also be positioned with eccentric orientations, such as with its normal inclined as much as ±30° to the line of sight, and good images can be obtained with its normal inclined as much as ±15° to the line of sight.

Figures 13A, 13B, 13C:
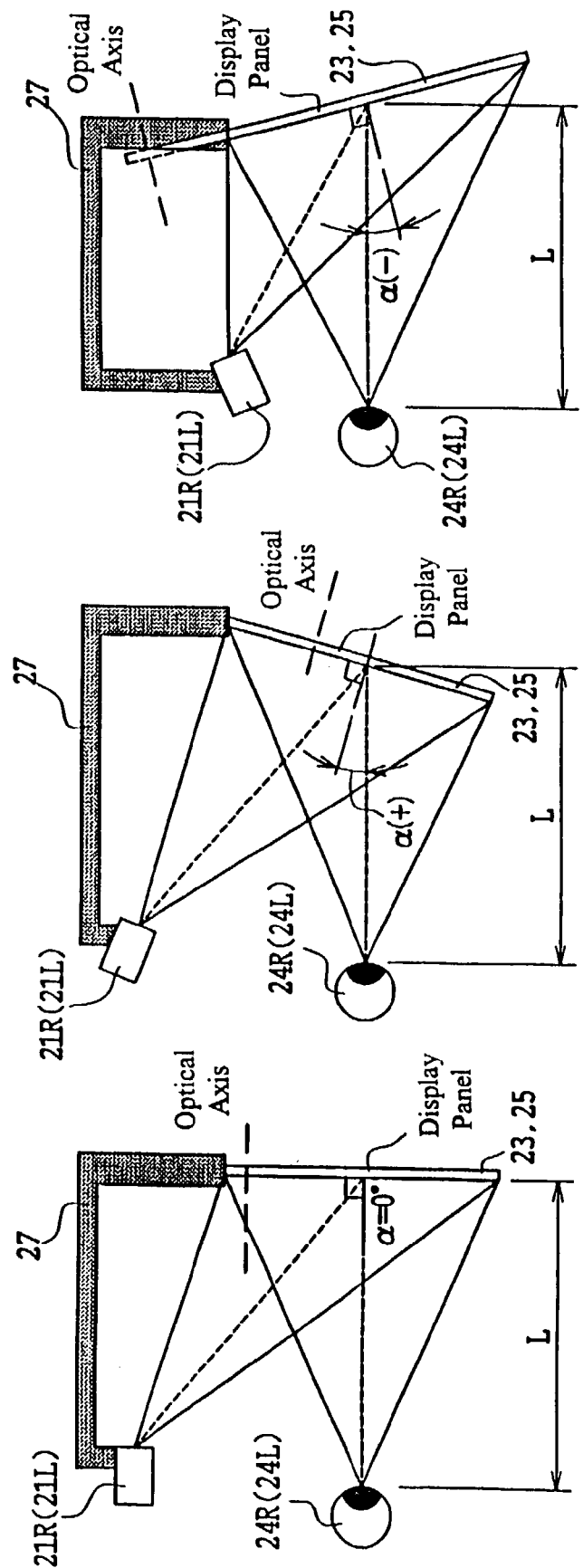
FIGS. 13(a)–13(c) illustrate various slightly modified display panels (as compared to the reflective display panel of FIGS. 11(a)–12) when in use, as seen in side views.

FIGS. 13(a)–13(c) are schematic diagrams showing alternative reflective display panel designs as viewed from the side, with the design shown in FIGS. 13(b) and 13(c) differing from the display panel design shown in FIGS. 12 and 13(a). In the embodiments shown in FIGS. 13(b) and 13(c), a line drawn normal to the display panel surface at its center is inclined to the horizontal plane. This allows the incidence angle of light projected onto the display panel to be adjusted, along with the amount of eccentricity of the Fresnel surface so as to provide optimal conditions for observation. The projection optical systems 21R and 21L are positioned with their midpoint within a vertical plane that contains the display panel normal and with a spacing corresponding to a viewer's interocular distance. In FIGS. 13(a)–13(c), 27 is a supporting arm that supports the two projection devices and the display panel. The inclination angle α of the display panel surface is the angle between a line drawn mid-way between the observation pupils of the display panel to the display panel center and the line drawn normal to the display panel surface at it center. If the surface normal is directed above the line drawn mid-way between the observation pupils of the display panel to the display panel center, the inclination angle α is positive. An inclination angle of ±30° or less is preferred for ease of viewing.

In the stereoscopic observation device of FIG. 13(a), the inclination angle α of the display panel surface is 0°. In the stereoscopic observation device of FIGS. 13(b) and 13(c), the inclination angle α has an absolute value of 30° or less. In any of FIGS. 13(a)–13(c), when the angle α is small, the observer can observe the displayed image with physiologically, optically natural feeling. However, even when the angle α is less than 30 degrees, the layout of FIG. 13(b) gives a more natural feeling to the observer than that of FIG. 13(c). In the layout of FIGS. 13(a) and 13(b), the decentering of the optical axis of the Fresnel mirror from the center of the display panel is relatively small. On the other hand, in the layout shown in FIG. 13(c), the decentering is relatively large, and this causes the tendency of producing large pupil aberration. However, in the layout of FIG. 13(c), the optical axis of the Fresnel mirror is outside of the display panel. This means that the center of fine rings of the Fresnel mirror does not appear on the display panel and this serves to improve the quality of the observed image.

Figures 14A, 14B:
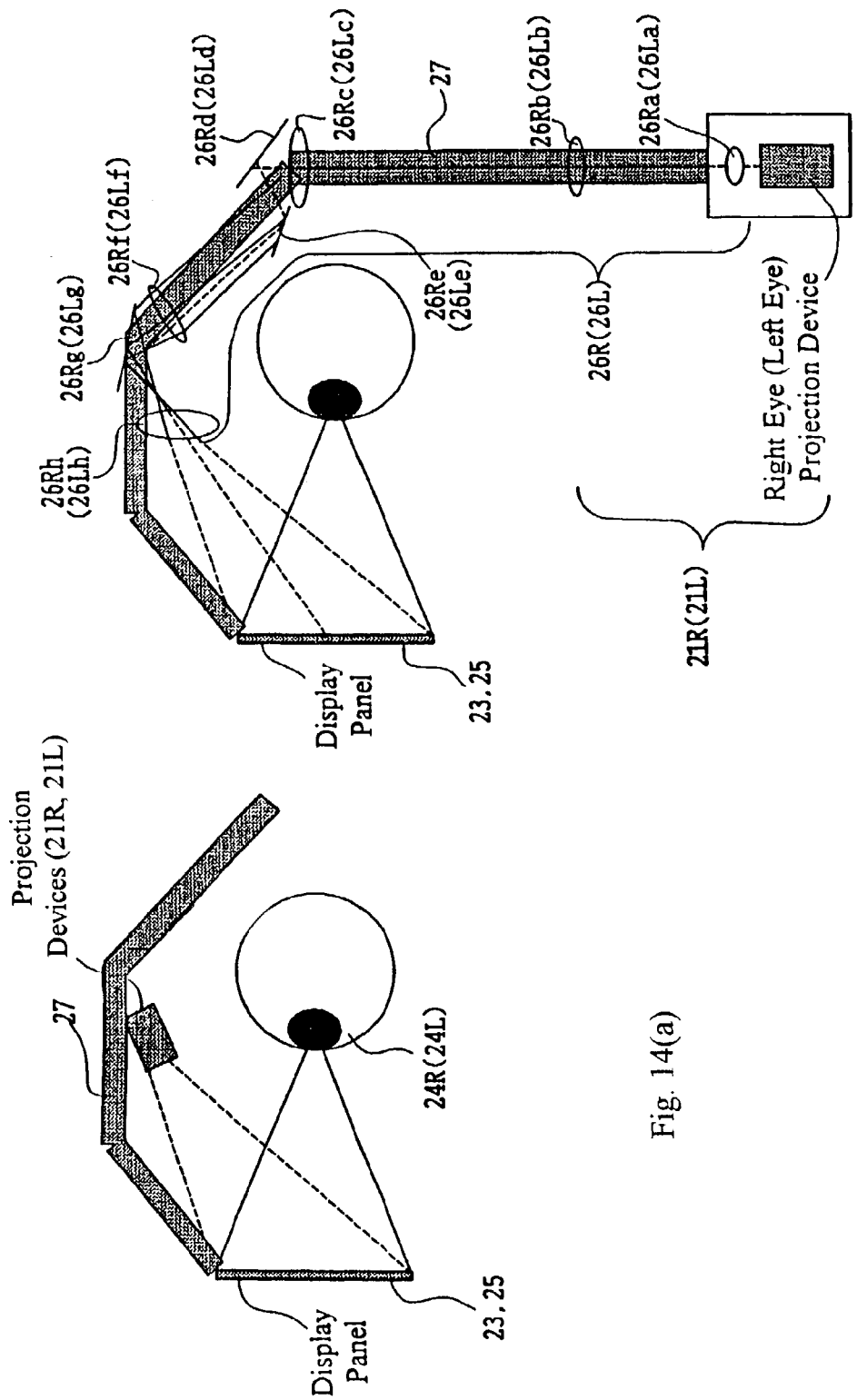
FIG. 14(a) shows a possible modification to the retaining and supporting member of the observation apparatus illustrated in FIG. 1.
FIG. 14(b) shows a possible modification to the projection system of the observation apparatus illustrated in FIG. 1.

FIGS. 14(a) and 14(b) show side views of a variation of the stereoscopic observation apparatus which is applicable to Embodiment 1 of the present invention. The stereoscopic observation apparatus of FIGS. 14(a) and 14(b) uses projection devices with a reflective-type display panel configuration. The display panel includes a Fresnel mirror 23 and diffusive optical system 25. This stereoscopic observation apparatus provides separated right and left viewing pupils which are enlarged, making it easy for the viewer to position his eyes within the left and right viewing pupils.

The stereoscopic observation apparatus of FIG. 14(b) includes the projection devices 21R (21L) of FIG. 14(a) and also includes an optical relay system. More specifically, an optical relay system 26R (26L) is provided within the inner portion of the supporting arm 27 which supports the projection device and the display panel. In the example of FIG. 14(b), the relay system 26R (26L) is formed of lenses 26Ra to 26Rc (26La to 26Lc), mirrors 26Rd and 26Re (26Ld and 26Le), lens 26Rf (26Lf), mirror 26Rg (26Lg), and lens 26Rh (26Lh). When formed in this manner, adequate distance can be provided between the projection device and the observer. As a result, interference between the projection device and the observer can be avoided.

Next, a specific configuration of a display panel which may be used for a stereoscopic observation apparatus as in the Embodiment 1 of the present invention, will be described.

Figures 15A, 15B:
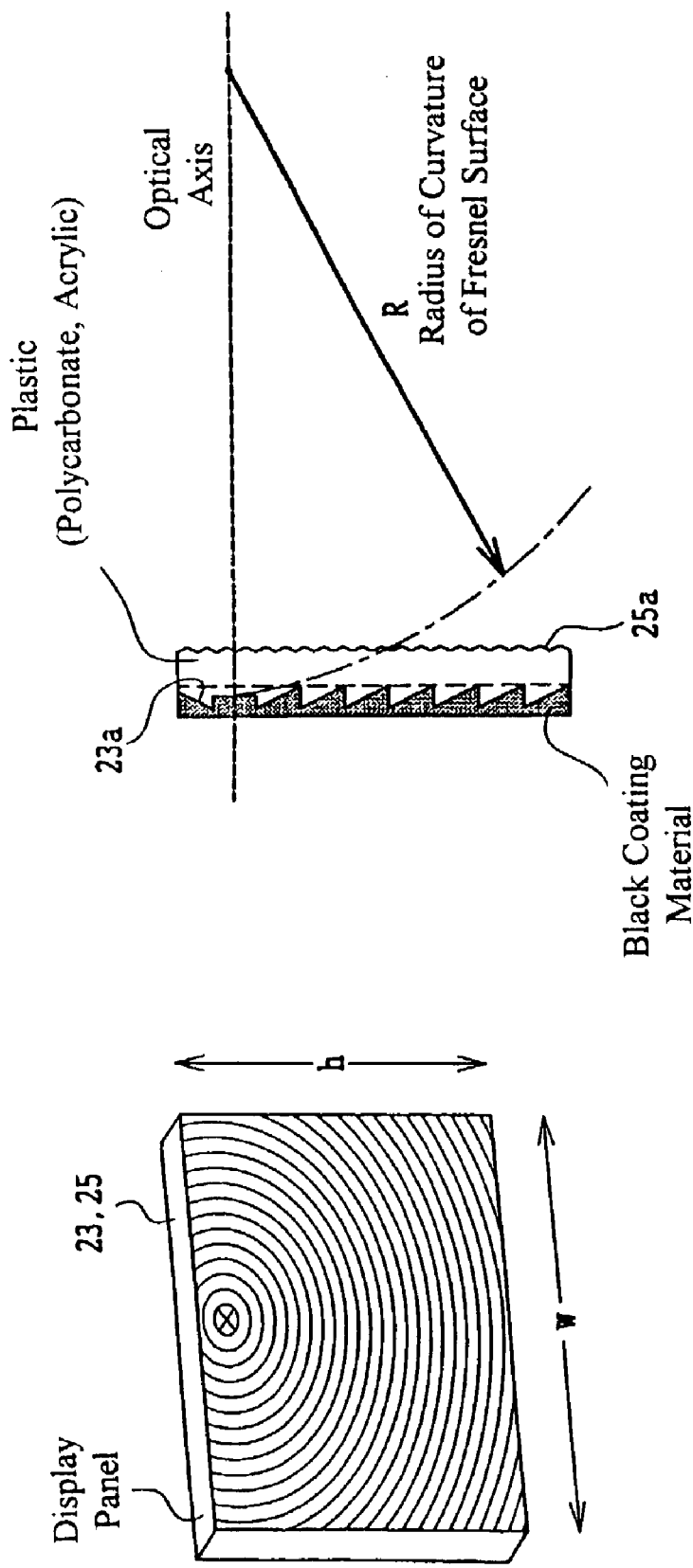
FIGS. 15(a) and 15(b) illustrate another example of a reflective display panel that may be used in an observation apparatus according to the invention which employs a reflective display panel arrangement, with FIG. 15(a) being a perspective view, and FIG. 15(b) being a side view.

FIGS. 15(a) and 15(b) illustrate an example of a reflective display panel that may be used in those observation apparatuses of the present invention that employ projectors and a reflective display panel arrangement, with FIG. 15(a) being a perspective view, and FIG. 15(b) being a side view.

This display panel includes a Fresnel surface 23a that has a diffusive optical system 25 (in this case a diffusive surface 25a) integrally formed thereon. The diffusive surface 25a is formed with random wave patterns. More specifically, the display panel of this embodiment is integrally formed by pressing a plastic resin such as acrylic or polycarbonate between a metal mold to form a Fresnel surface on one side of the plastic and to form random wave patterns which act as a diffusive surface on the other side of the plastic. Aluminum is then coated as a reflective film onto the Fresnel lens surface 23a, and a black coating is then applied to the aluminum, as indicated in FIG. 15(b). The Fresnel surface 23a of the display panel operates to form the observation pupils, which are the images of the two projector apertures. The diffusive surface 25a operates to enlarge the observation pupils for easier viewing of the images by an observer. As shown in FIG. 15(a) this display panel is configured as an eccentric Fresnel mirror with the Fresnel surface, reflective aluminum coating, and black coating on the back side thereof so as to form what will hereinafter be termed a "back-surface" mirror.

Next, the radii of curvature R associated with a Fresnel surface 23a for each of a front surface mirror and a back-surface mirror will be considered. The radius of curvature R of a mirror surface when configured as a back-surface mirror is given by: $R=2n \cdot f$, where n is the index of refraction and f is the focal length of the mirror. However, the radius of curvature of a mirror surface when configured as a front surface mirror is given by: $R=2 \cdot f$. Therefore, according to the display panel illustrated, aberrations are reduced when an image is formed at the pupil because a larger radius of curvature R of the Fresnel surface can be provided when the mirror configuration is that of a back-surface mirror. Furthermore, the Fresnel surfaces of the display panel of the present embodiment are configured so as to have the same shape as an aspheric lens, with the radii of curvature of the surfaces thereof increasing toward the periphery of the Fresnel surface 23a. When configured in such a manner, aberrations can be more favorably corrected.

FIGS. 16(a) and 16(b) show another embodiment of a reflective display panel that is applicable to a reflective stereoscopic observation apparatus according to the present invention, with FIG. 16(a) being a side view of the reflective display panel, and FIG. 16(b) being an enlarged view of the diffusive means, in this case wave patterns 25b on the reflective display panel surface. As best shown in FIG. 16(b), the display panel of the present embodiment is configured with an integrally formed, corrugated surface 25b having wave patterns that are formed on the Fresnel surface 23a. The corrugated surface 25b formed directly on (i.e., superimposed with) the Fresnel prism surfaces, as in FIG. 16(b), may be used in lieu of the separate diffusive surface 25a having a wave pattern that is positioned adjacent the Fresnel surface 23a in FIG. 15(b). As shown in FIG. 16(a), a reflective film is coated on the Fresnel surface 23a so that what is termed a back-surface, Fresnel mirror is formed. This allows the actual back surface of the display panel to be a smooth surface.

With a reflective display panel, as shown in FIG. 15(a), the projection light normally passes through the diffusive surface twice, both enroute to and from the mirror surface. However, in the reflective display panel shown in FIG. 16(a), this is not the case since the mirror surface and the diffusive surface are made as a single surface. Thus, the light is affected just once by the diffusive surface. Therefore, there is less diffusive effect for the arrangement as shown in FIG. 16(b) as compared with the arrangement as shown in FIG. 15(b) and thus the amount of blurring and image deterioration is reduced with the arrangement as shown in FIG. 16(b).

Figure 17:
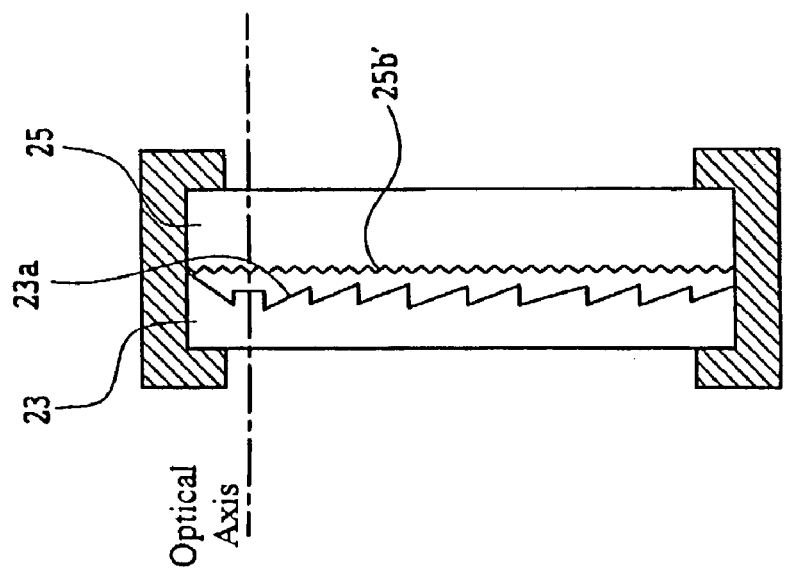
FIG. 17 is a side view of another example of a reflective display panel that may be used in an observation apparatus according to the invention which employs a reflective display panel arrangement.

FIG. 17 is a side view of another example of a reflective 3-D display panel that can be used with the observation apparatuses of the present invention that employ a reflective display panel and projectors. The display panel shown in FIG. 17 includes a Fresnel mirror that serves as the observation pupil forming optical system, a diffusive means such as a diffusive optical system 25 that is formed of a plate with a diffusive surface 25b' that includes corrugations or waves. The diffusive surface 25b' is immediately adjacent to, or at least in close proximity to, the Fresnel surface 23a, that is positioned at the focus position of the projected images. In this manner, blurring of the images is minimized despite the diffusive effect, used to enlarge the viewing pupils, occurring twice. Whereas FIG. 17 illustrates what is termed a "back-surface Fresnel mirror" having a diffusive plate in close proximity to the mirror surface, a configuration whereby a diffusive film (instead of a diffusive plate) is applied in close proximity to the mirror surface of such a mirror will be discussed next.

Figure 18:
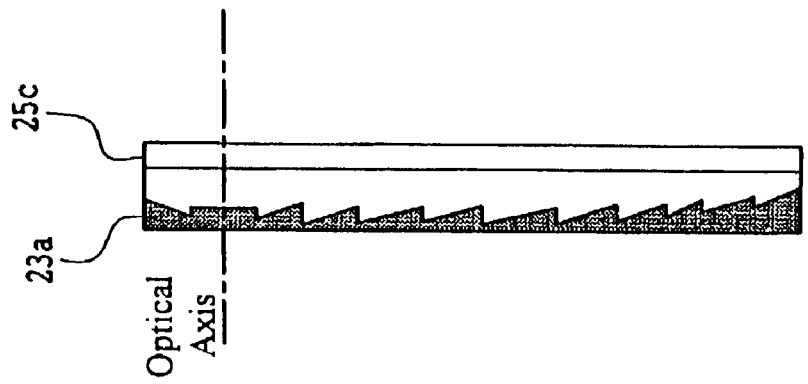
FIG. 18 is a side view of another example of a reflective display panel that may be used in an observation apparatus according to the invention which employs a reflective display panel arrangement.

FIG. 18 is a side view of another example of a reflective 3-D display panel that can be used with the reflective 3-D observation apparatus of the present invention. The display panel of this example is formed by applying a diffusive film 25c to the observation pupil forming optical system, which itself is immediately adjacent the eccentric, Fresnel back-surface mirror having a reflective surface 23a. The diffusive film 25c may be one that scatters the light using particles within the film or one that scatters light using corrugations as the film's surface structure.

Figure 19C:
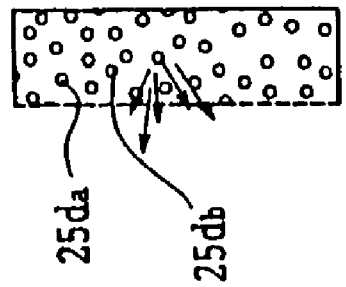
FIGS. 19(a)–19(c) relate to other examples of reflective display panels that may be used in an observation apparatus according to the invention that employs a reflective display panel arrangement, with FIG. 19(a) being a side view of the display panel, FIG. 19(b) being a side view of a variation on the structure illustrated in FIG. 19(a), and FIG. 19(c) showing a diffusive structure inside the display panel that is used to diffuse the light.
Figure 19B:
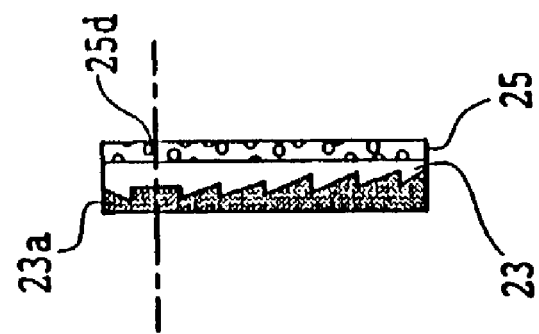
Figure 19A:
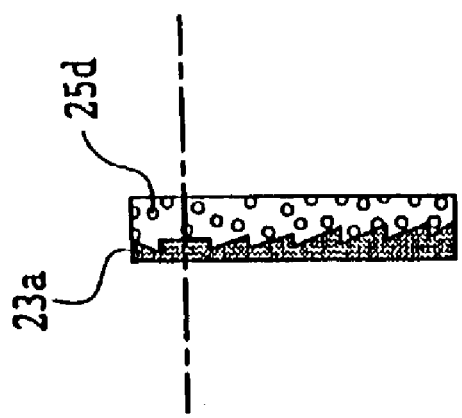

FIGS. 19(a)–19(c) relate to other reflective, display panel designs that can comprise a component of a stereoscopic observation apparatus according to the present invention, with FIG. 19(a) being an enlarged, side view of one design, with FIG. 19(b) being an enlarged, side view of another design, and with FIG. 19(c) being an even more enlarged side view of a diffusive film showing the internal scattering of light that occurs within the film. The display panels illustrated are of the reflective-type that use a material within the film as a diffusive means. The internal diffusive material, as shown in FIG. 19(c), is formed by mixing fine, transparent particles 25da, 25db, etc., which differ in refractive index, into a transparent plastic material. When struck by light, these fine particles diffuse (i.e., scatter) the light as illustrated. The display panel shown in FIG. 19(a) employs an eccentric, Fresnel back-surface mirror 23a with the transparent material that contains the diffusive particles 25d being immediately adjacent the reflective surface of a Fresnel mirror. The display panel in FIG. 19(b) instead uses a planar layer of diffusive material 25d as the diffusive optical system 25 that is applied to a transparent layer 23 that lies in contact with the reflective surface 23a of the Fresnel mirror.

Figure 20C:
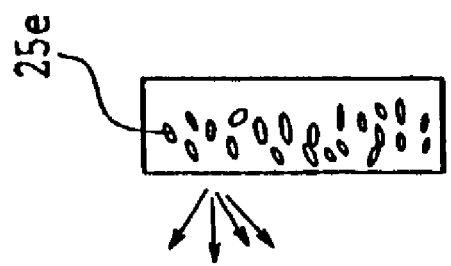
FIGS. 20(a)–20(c) relate to another example of a reflective display panel that may be used in an observation apparatus according to the invention that employs a reflective display panel arrangement, with FIG. 20(a) being a side view of the display panel, FIG. 20(b) being a side view of a variation on the structure illustrated in FIG. 20(a), and FIG. 20(c) showing a diffusive structure inside the display panel.
Figure 20B:
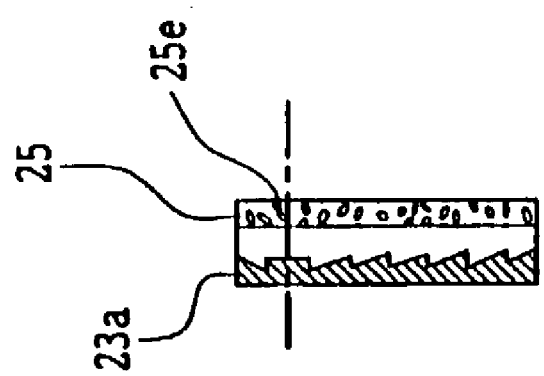
Figure 20A:
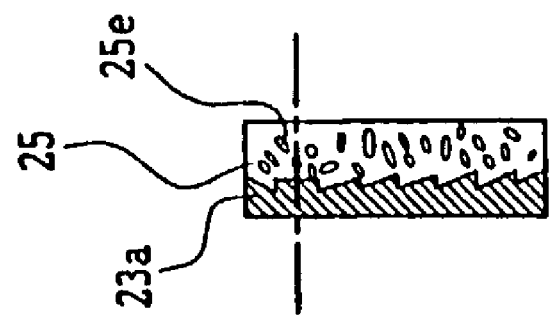

FIGS. 20(a)–20(c) show other reflective display panel designs that are similar to those shown in FIGS. 19(a)–19(c), respectively, with the exception of the material which is used to cause the light to diffuse. Whereas in FIGS. 19(a)–19(c), particles used have different refractive indexes, in FIGS. 20(a)–20(c), the diffusive effect is created by polymer liquid crystal which has been photo polymerized so as to be in a fixed but random internal arrangement.

Just as in FIG. 19(c), the diffusion occurs within the material rather than at its surface. Therefore, a display panel of this design, as well as the design shown in FIGS. 19(a)–19(c), can have a smooth surface which is much easier to wipe clean than is a display panel that diffuses the light by using corrugations or waves in a surface that forms an optical interface between two mediums of different refractive index, such as shown in FIGS. 15(b) and 16(b). In addition, it is easier to apply an anti-reflection film so as to reduce undesired reflection of incident light where the surface is smooth.

Figure 21A:
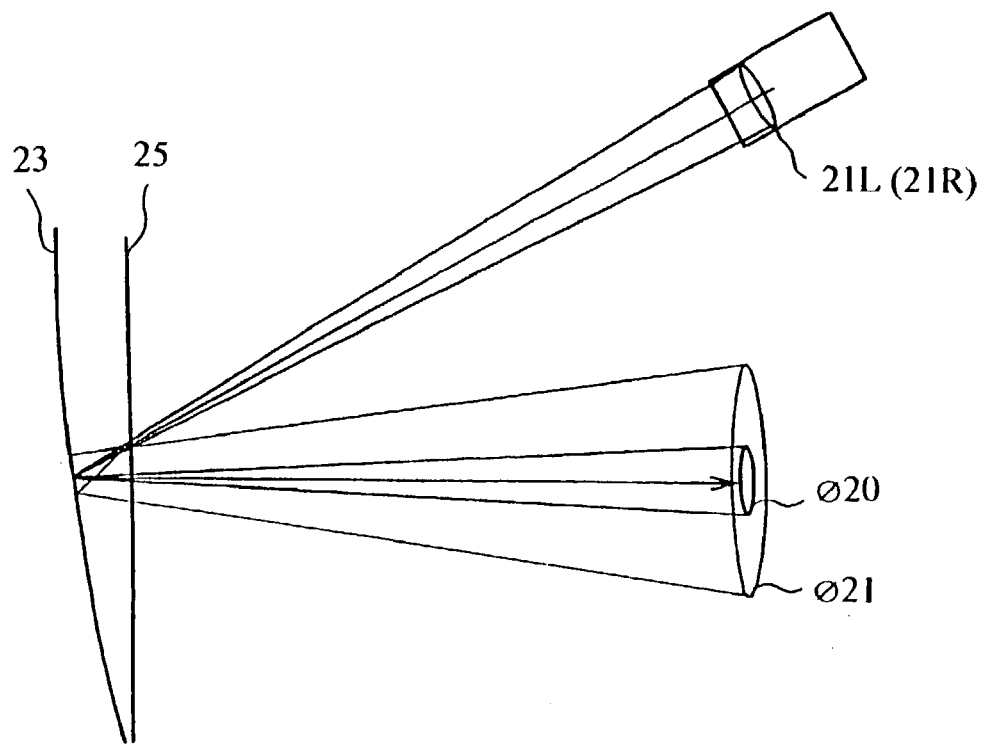
FIGS. 21(a) and 21(b) relate to another example of a reflective display panel that uses a holographic optical element as a diffusive means, and that can be used in an observation apparatus according the invention that employs a reflective display panel arrangement, with FIG. 21(a) being an explanatory diagram and FIG. 21(b) showing the display panel in use.
Figure 21B:
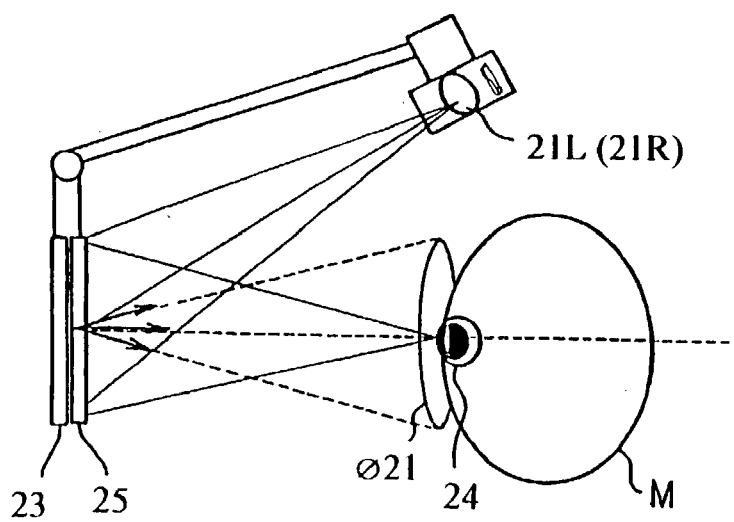

FIGS. 21(a) and 21(b) relate to another example of a reflective 3-D display panel that uses a holographic optical element as a diffusion means, with FIG. 21(a) being a side explanatory diagram and FIG. 21(b) showing the display panel in use. The stereoscopic observation device of this example is configured with the display panel and the projection devices positioned such that left and right images are projected from positions that are near the observer's head. The projection positions can be from either side, or from above, the observer's head. In FIG. 21(a), the Fresnel reflective surface of the display panel is eccentric to account for the positions of the projectors. This enables the projection optical systems 21L (21R) to be positioned out of the way.

FIGS. 22(a)–23(b) are explanatory diagrams which are used to explain the diffusion and bending (diffraction) effect of the holographic optical element used in the display panel embodiment of FIGS. 21(a) and 21(b). A description of the relationship between diffusion and the bending (diffraction) action of the diffusive plate 25 when the diffusive plate is a transmission hologram follows, and of the placement relationship of the diffusive plate 25 when formed of a transmission hologram and of the concave Fresnel mirror 23.

Figure 22A:
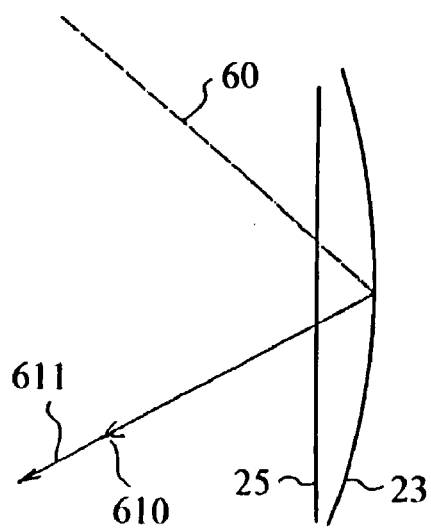
FIGS. 22(a)–23(b) are explanatory diagrams which are used to explain the diffusive bending (i.e., diffraction) effect of the holographic optical element used in the display panel shown in FIGS. 21(a) and 21(b) that is used to diffuse the light.

As is well known in the art, a transmission hologram diffusive plate is made by recording the interference pattern between a reference beam and object light from a diffused light source (a secondary light source). When the interference pattern between a reference beam and a diffused light source is recorded for a transmission hologram, with both being on the same axis (in-line placement) and on one side of the recording material, then the center light ray of the light beam 60 (FIG. 22(a)) from the projection optical system 21L (21R) initially enters into the diffusive plate 25 and passes directly through without being bent (diffracted) by the diffusive plate 25, as shown in FIG. 22(a). This light is often referred to as the "zero-order light". Furthermore, after the light beam 60 has passed through the hologram, the ray directions are changed upon being reflected by the concave Fresnel mirror 23. These reflected light rays will then re-enter into the diffusive plate 25, but this time they are incident on the rear side. If the angle of incidence satisfies the reconstructed light incident angle (i.e., the angle where the diffraction efficiency approaches its peak) of the transmission hologram, then the light (other than the zero-order light) will be diffused by way of diffraction.

On the other hand, if the angle of incidence of the incident light at the time of the second incidence satisfies the reconstructed light incidence angle, then the main light beam 60 at the time of the first transmission passes directly through without diffraction, and the light around the center light ray that passes through at the time of the second transmission will be diffused. In either case, the zero-order light 610 and the central light beam 611 proceed in the same direction. FIG. 22(a) shows these elements but the diffused light is not shown. In this drawing, only the central light ray 611 from among the diffused light being diffracted and the zero-order light 610 that is not diffracted by the diffusive plate 25 are shown. The zero-order light 610 and center ray of the central light beam 611 proceed in the same direction and arrive at the center of the exit pupil ø21 (FIG. 21(b)) of the projection display device.

Accordingly, as shown in FIG. 22(a), in the case wherein the diffusive plate 25 formed of a transmission hologram has only a diffusive action and does not have a bending action on the optical path, not only the diffused light but also the zero-order light 610 arrives at the exit pupil ø21. The undesirable result is that a spot can be seen for the zero-order light 610 in the center of the projected image being observed.

Figure 22B:
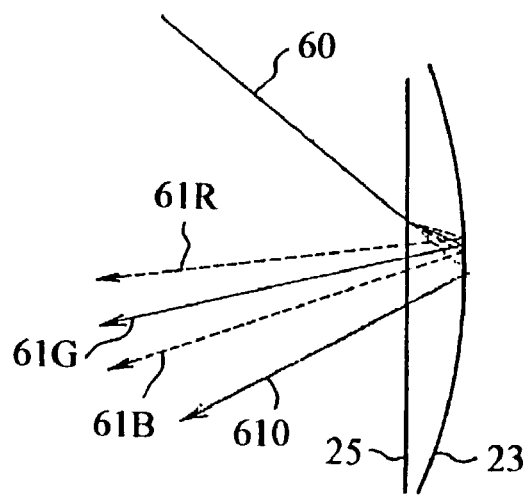
Figure 22C:
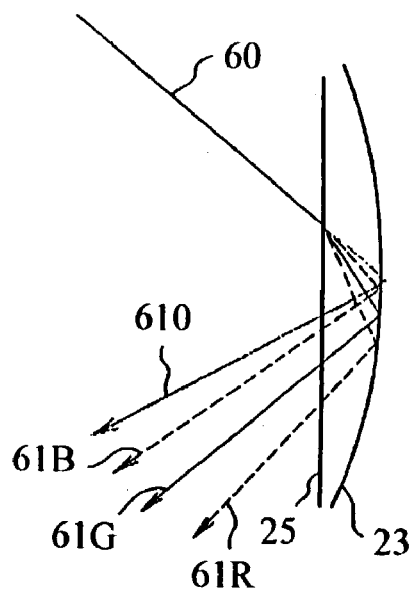
Figure 23A:
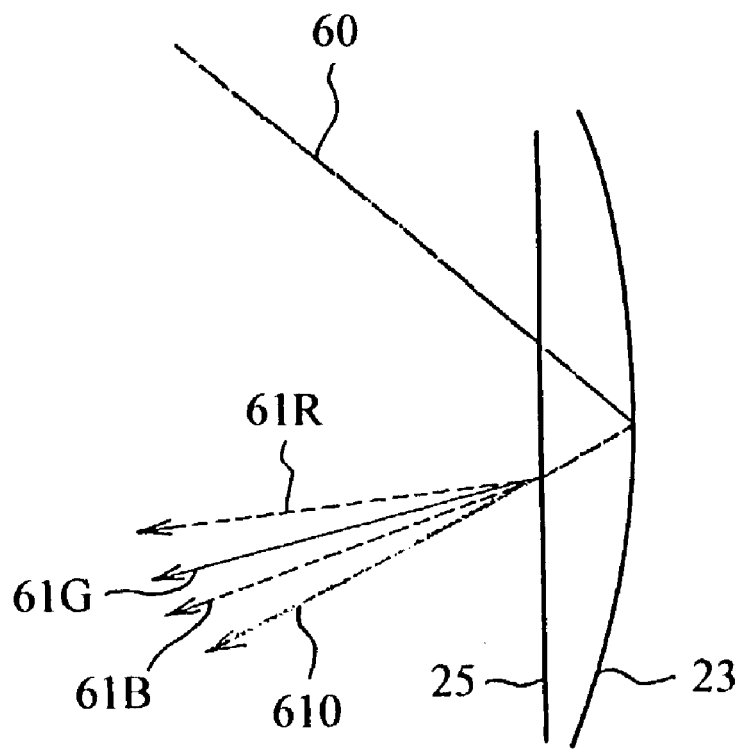
Figure 23B:
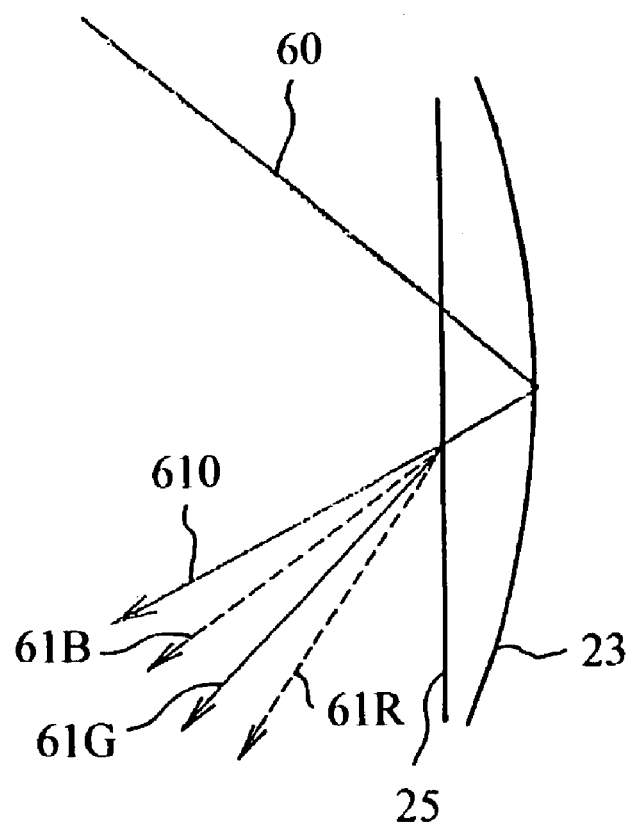

For this reason, a diffusive plate 25 formed of an off-axis, transmission hologram is preferably used. With such a diffusive plate, a bending of the light beam together with diffusion occurs when the incident light satisfies the wavelength and incidence angle of the beam used to construct the transmission hologram. FIGS. 22(b) and 22(c) show the case where the incident light satisfies the wavelength and incidence angle of the beam used to construct the transmission hologram upon first incidence; and FIGS. 23(a) and 23(b) show the case where the incident light satisfies the wavelength and incidence angle of the beam used to construct the transmission hologram at second incidence. FIG. 22(b) and FIG. 23(a) illustrate the diffraction angle being toward the normal to the surface; and FIG. 22(c) and FIG. 23(b) illustrate the diffraction angle being away from the normal to the surface. In each drawing, the indication of the diffused light other than the central ray is omitted. Thus, only the central rays, of the diffused beams of wavelengths R, G, B that are diffracted by the diffusive plate 25, are shown by 61R, 61G, and 61B, respectively. As is evident from each of the drawings, when using a transmission hologram having a bending action on the light beam at the diffusive plate 25, it becomes possible to separate the zero-order light 610 that is not diffracted by the hologram from the diffracted beams 61R, 61G and 61B. As a result it is possible to provide a construction wherein the zero-order light is not visible from the exit pupil ø21 of the projection apparatus. More specifically, a construction is preferred wherein the positioning of the exit pupil ø21 of the projection apparatus is such that the zero-order light 610 enters after being separated by at least one-half the pupil diameter from the center of the exit pupil ø21.

Figure 24A:
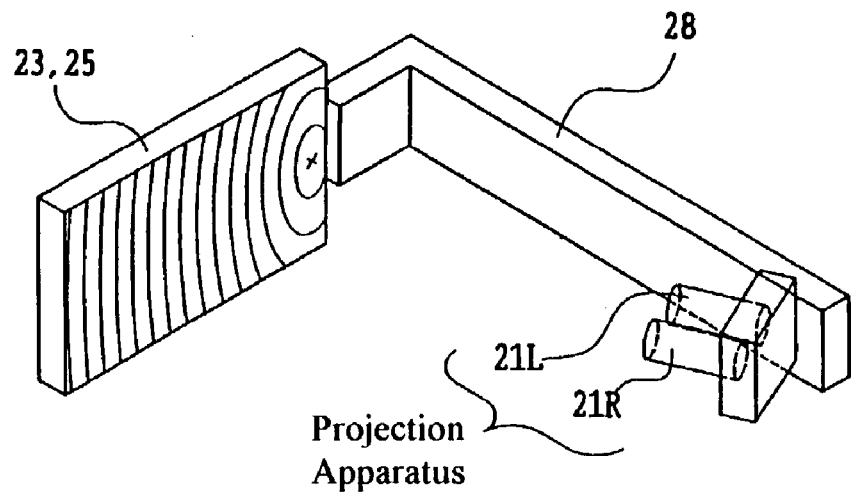
FIGS. 24(a) and 24(b) relate to the positioning of a reflective display panel and a projection apparatus that can be used in an observation apparatus according to the invention that employs a reflective display panel arrangement, with FIG. 24(a) being a perspective view and FIG. 24(b) being a top view.
Figure 24B:
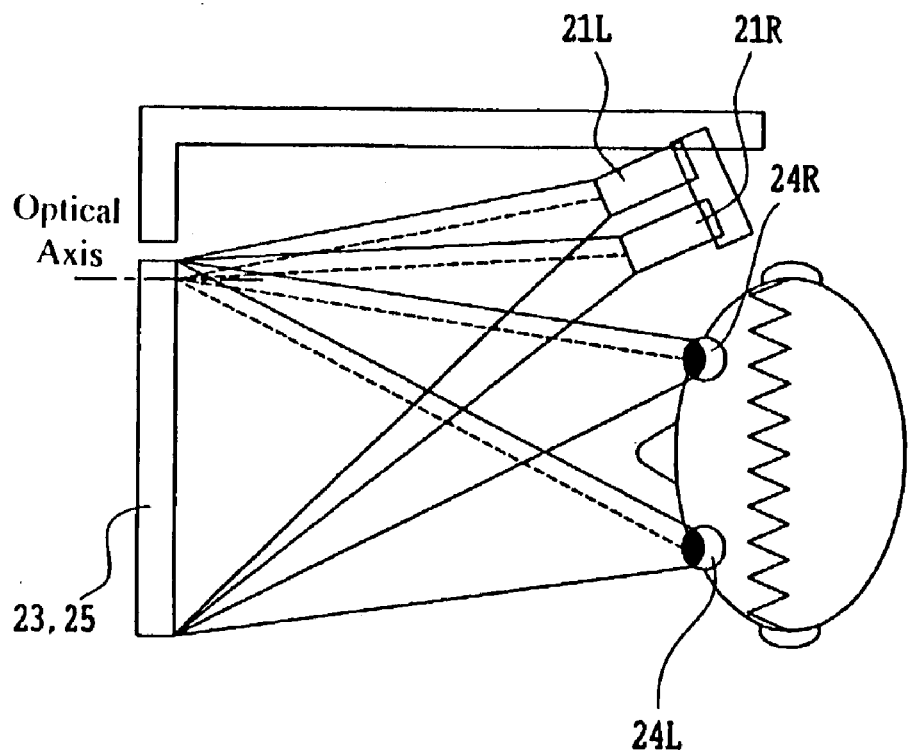

FIGS. 24(a) and 24(b) show the arrangement of the reflection-type 3-D observation device that may form some components of the present invention, with FIG. 24(a) being a perspective view and FIG. 24(b) being a top view. The display panel 23,25 and the two projection devices 21L, 21R are attached to a supporting member 28. An attachment member (not illustrated) detachably attaches the display panel to the retaining member 28. The two projection devices 21L, 21R may be positioned on either the right or left side of the display panel 23,25, but for convenience of illustration are shown as positioned on the right side in FIGS. 24(a) and 24(b).

The Fresnel reflecting surface of the display panel has its optical axis de-centered with respect to the center of the display surface. The de-centering may be either to the right or left, but for convenience of illustration it is illustrated as being to the right in FIGS. 24(a) and 24(b). A sufficient angle is provided between the optical axis of the light entering the center of the display panel from the right and left projection devices versus the optical axis of the light emerging from the display panel to the viewer's respective right or left pupils 24R (24L) so that the projection devices and the viewer's head do not interfere with each other.

Figure 25:
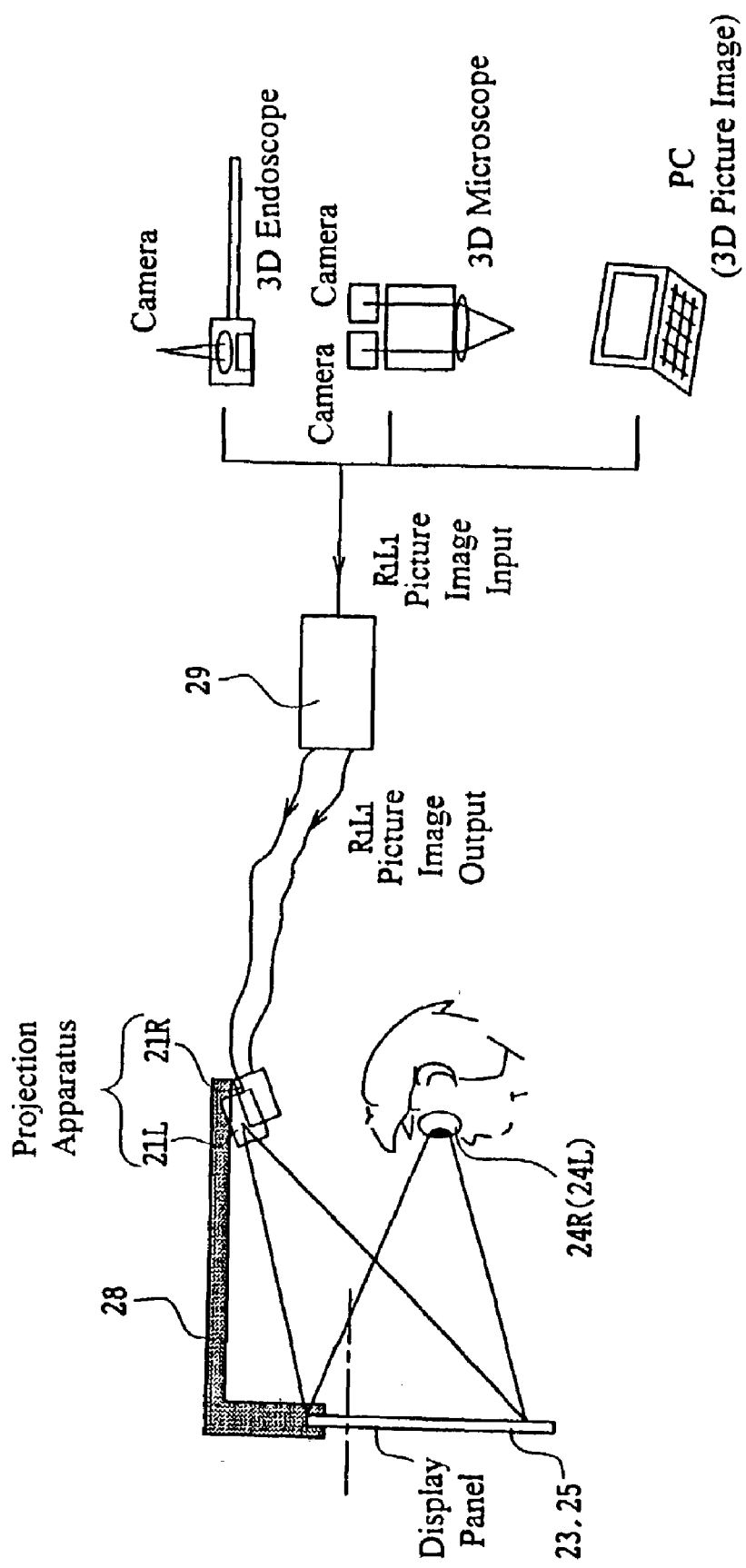
FIG. 25 shows an observation system that uses an observation apparatus according to the invention that employs a reflective display panel arrangement.

FIG. 25 illustrates a 3-D observation system. Right and left projection apparatuses 21L, 21R are connected to a projection control apparatus 29. The projection control apparatus 29 is made so that images photographed by right and left cameras provided in a 3-D image input apparatus, such as a 3-D endoscope or a 3-D microscope, are selectively input, and the selected images are then sent to the right and left projection apparatuses and are displayed. The projection control apparatus 29 can be configured so that a 3-D image having parallax and created by a personal computer can be projected and viewed by an observer, just as any other selectively input image.

Next, various products to which the observation apparatus of the present invention has been applied will be described.

Figure 26:
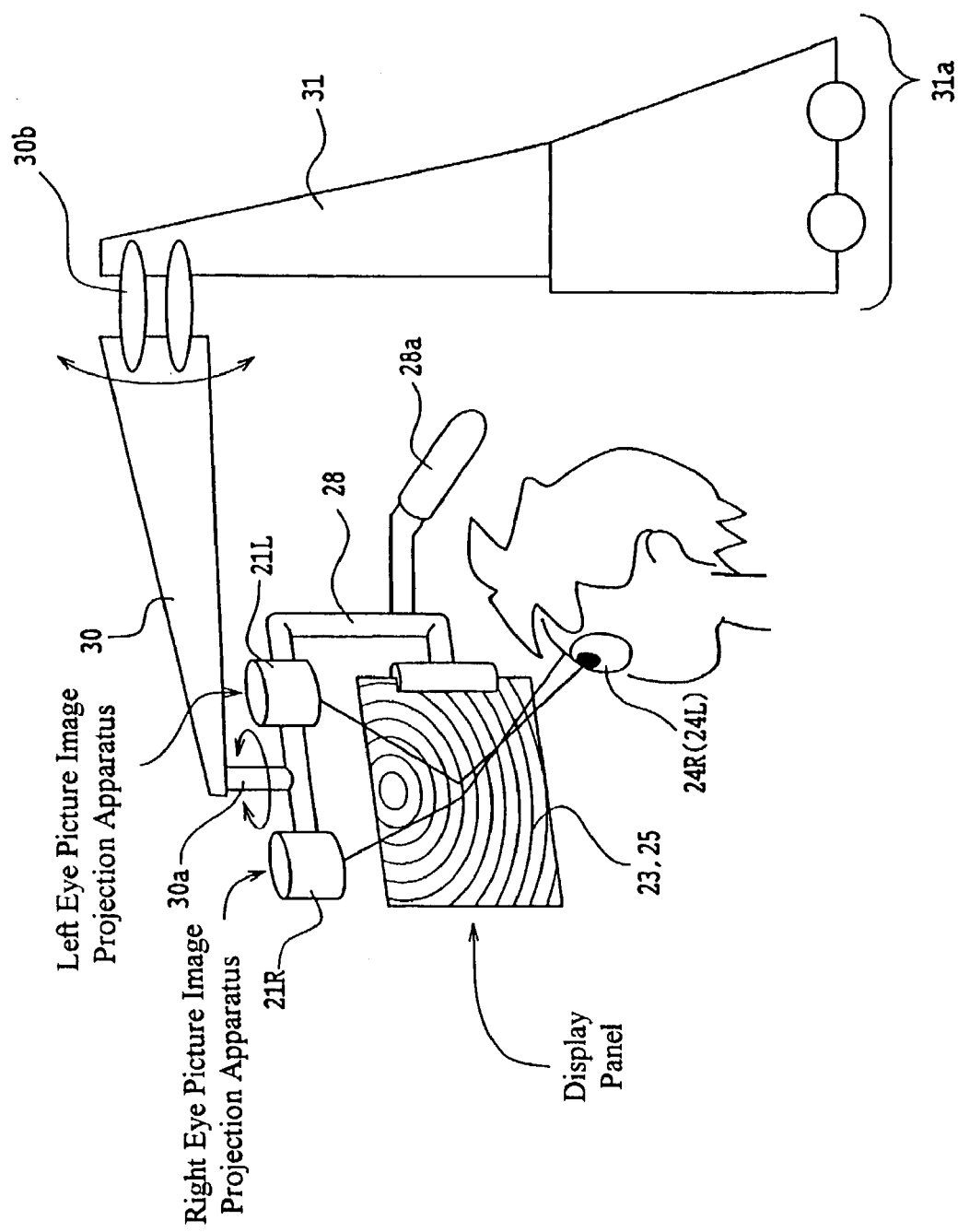
FIG. 26 illustrates a first example of a product that uses an observation apparatus according to the present invention.

FIG. 26 illustrates a first example of a product that uses an observation apparatus according to the present invention, wherein a reflective display panel 23, 25 is detachably supported by a retaining member 28 that also supports right and left projection apparatuses 21R, 21L. The 3-D display apparatus projects onto the display panel images from the right and left projection apparatuses that have parallax, and these images are then reflected by the display panel and displayed so that they can be viewed by an observer from observation pupils which have been enlarged by a diffusing means.

The retaining member 28 is connected to the support arm 30 via a connecting unit 30a so as to be movable in the directions indicated by the double-headed arrow, and the support arm 30 is connected to the support unit main body 31 via a connecting unit 30b so as to be movable in the directions indicated by the double-headed arrow. Furthermore, by moving the retaining member 28 and the support arm 30 in a desired direction, it is possible for the observer to change his observing posture. In addition, a handle 28a is provided on the retaining member 28, for facilitating grasping and repositioning of the retaining member 28. Also, the support unit main body 31 may include casters 31a. By moving the support unit main body 31 it is possible for the observer to change his observation position.

Figure 27:
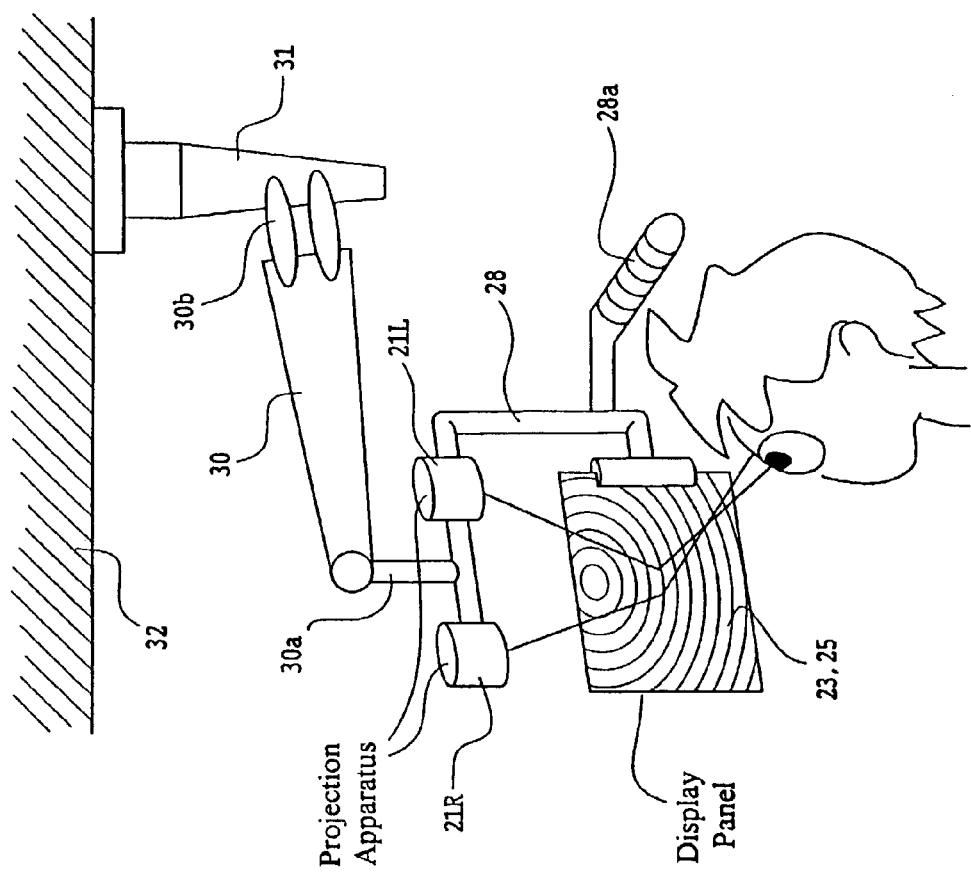
FIG. 27 illustrates a second example of a product that uses an observation apparatus according to the present invention.

FIG. 27 illustrates a second example of a product that uses an observation apparatus according to the present invention, wherein a support unit main body 31 is attached to a ceiling 32. The support unit main body 31 supports the support arm 30. The support arm 30, in turn, supports the same structure as illustrated in FIG. 26. This product makes it possible to reduce the space needed by the observation apparatus.

Figure 28:
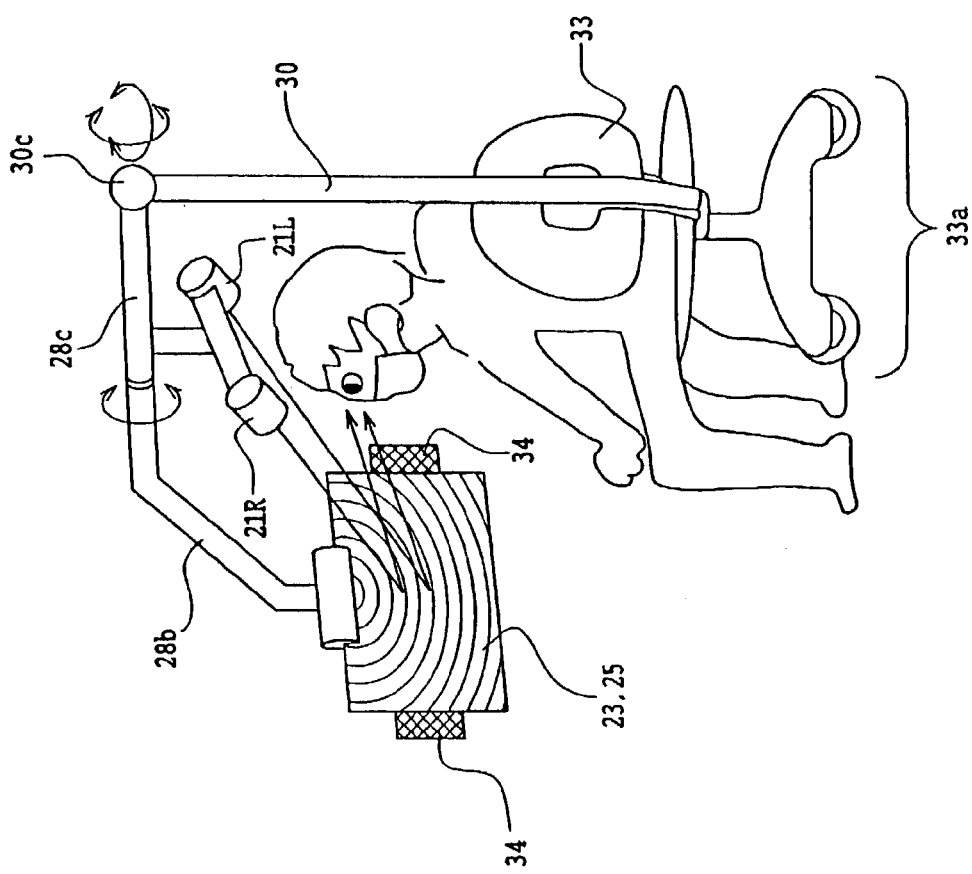
FIG. 28 illustrates a third example of a product that uses an observation apparatus according to the present invention.

FIG. 28 illustrates a third example of a product that uses an observation apparatus according to the present invention. This product is composed of a support arm 30 which is attached to a chair 33 that is used during surgery. The display panel in this embodiment is detachably attachable to a retaining member 28b, and the projection apparatuses are attached to the supporting member 28c. In addition, the retaining member 28b is movably attached to a supporting member 28c so as to be rotatable, as shown by the double-headed arrow. Consequently, it is possible to change the orientation of the display panel with respect to the projection apparatus. The supporting member 28c, to which the projection apparatus is attached, is in turn attached to the support arm 30 via a connecting unit 30c so as to be movable 360°, thereby making it possible to change the orientation of the display panel and projection apparatus as a unit, as indicated by the two double-headed arrows. Furthermore, handles 34 are attached to the right and left sides of the display panel. Consequently, the action of adjusting the orientation can be easily accomplished without touching the display surface of the display panel. In addition, casters 33a are provided on the chair 33 which may be used during surgery. Consequently, it is possible to change the observation position by moving the chair.

Figure 29:
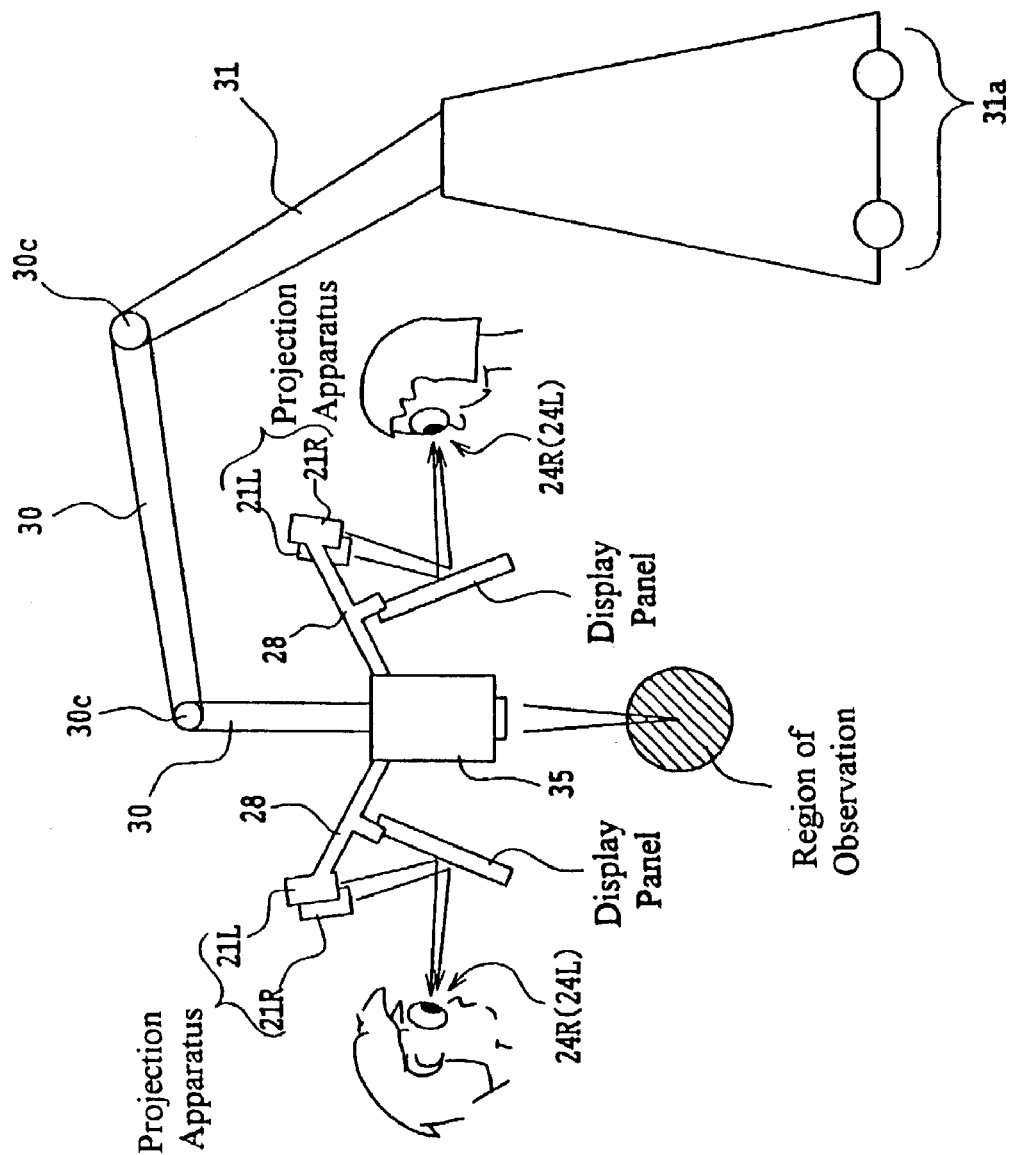
FIG. 29 illustrates a fourth example of a product that uses plural observation apparatuses according to the present invention.

FIG. 29 illustrates a fourth example of a product that uses plural reflective observation apparatuses according to the present invention. This product employs two 3-D observation apparatuses in which each display panel is detachably attached to a retaining member 28. The retaining members 28,28 are each attached to an image input unit 35 of a surgical microscope that is supported by two movable support arms 30,30 which are connected via a connecting unit 30c. One of the support arms 30 is connected by another connecting unit 30c to a support unit main body 31, on which casters 31a are provided.

Two cameras are housed in the image input unit 35 of the surgical microscope, and input images are sent to the projection apparatuses of each of the 3-D observation apparatuses. Consequently, it is possible for the 3-D images of the surgical microscope to be observed simultaneously by a plurality of observers.

Figure 30:
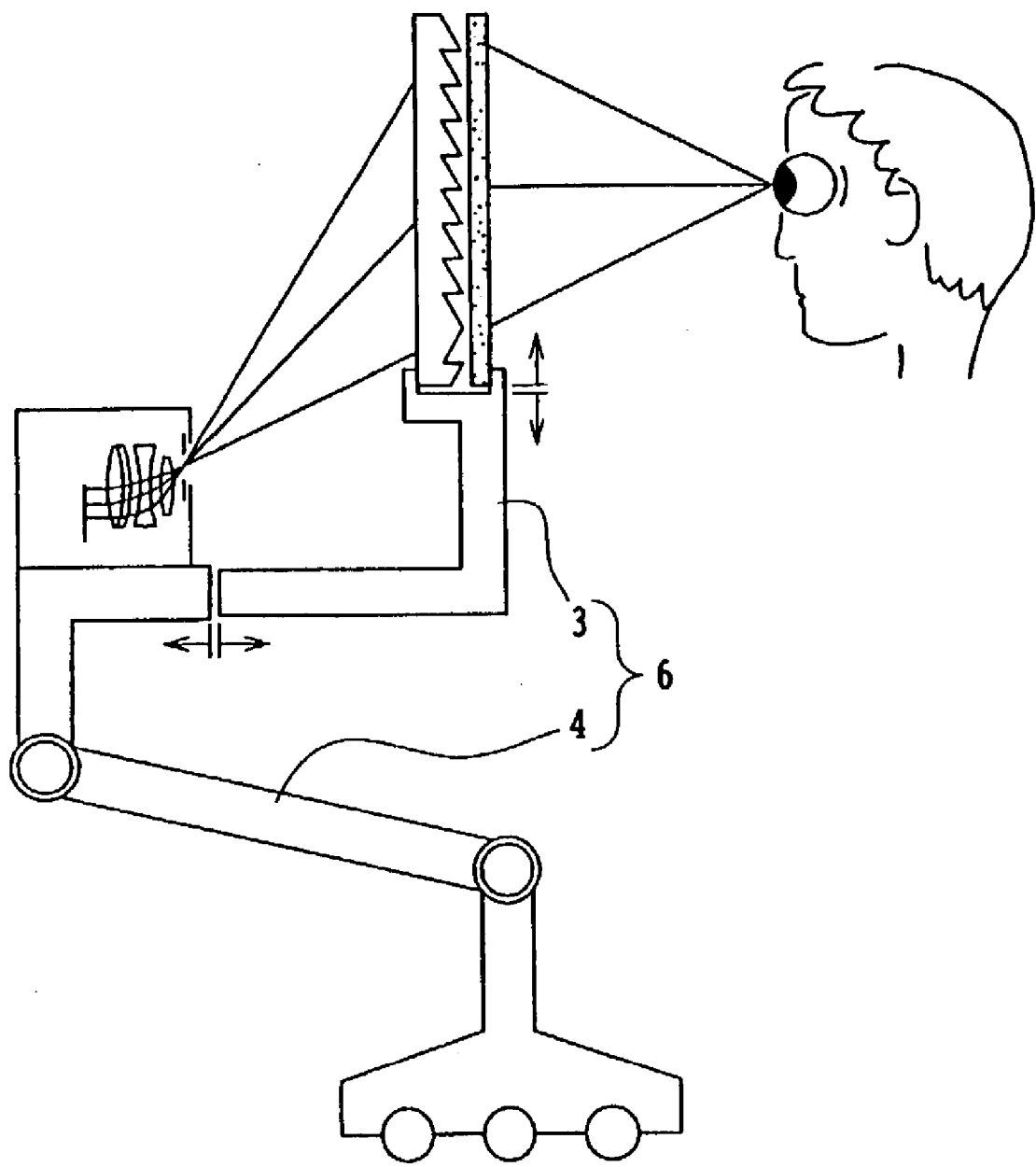
FIG. 30 illustrates a fifth example of a product that uses an observation apparatus according to the present invention.

FIG. 30 illustrates a fifth example of a product that uses the observation apparatus according to the present invention, wherein the observation apparatus is a transmissive stereoscopic observation apparatus. In this case, the retaining and supporting member 6 is formed of retaining member 3 and supporting member 4. The retaining member 3 is detachable from the supporting member 4 so as to allow it to be easily sterilized.

Figure 31:
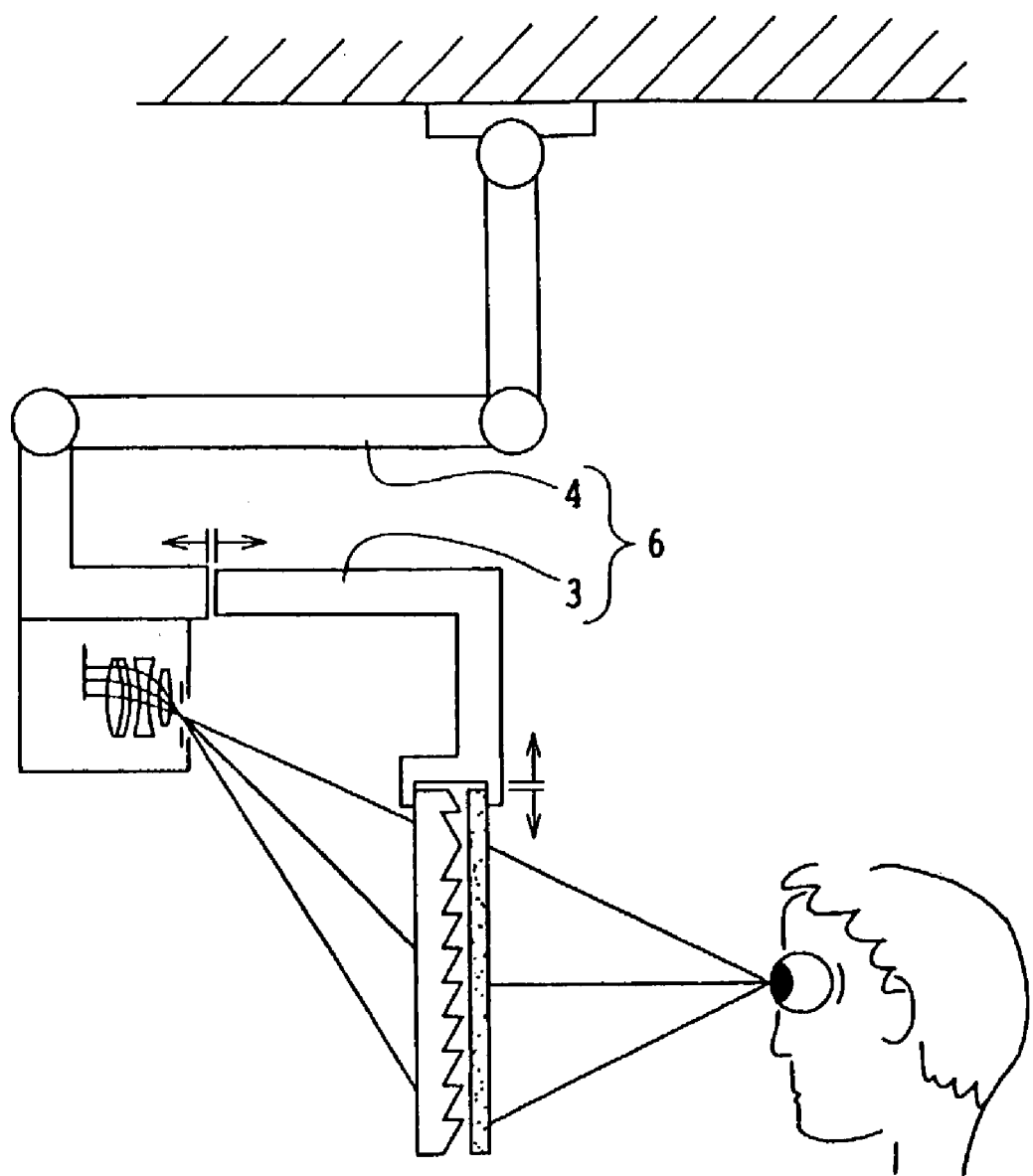
FIG. 31 illustrates a sixth example of a product that uses an observation apparatus according to the present invention.
Figure 32:
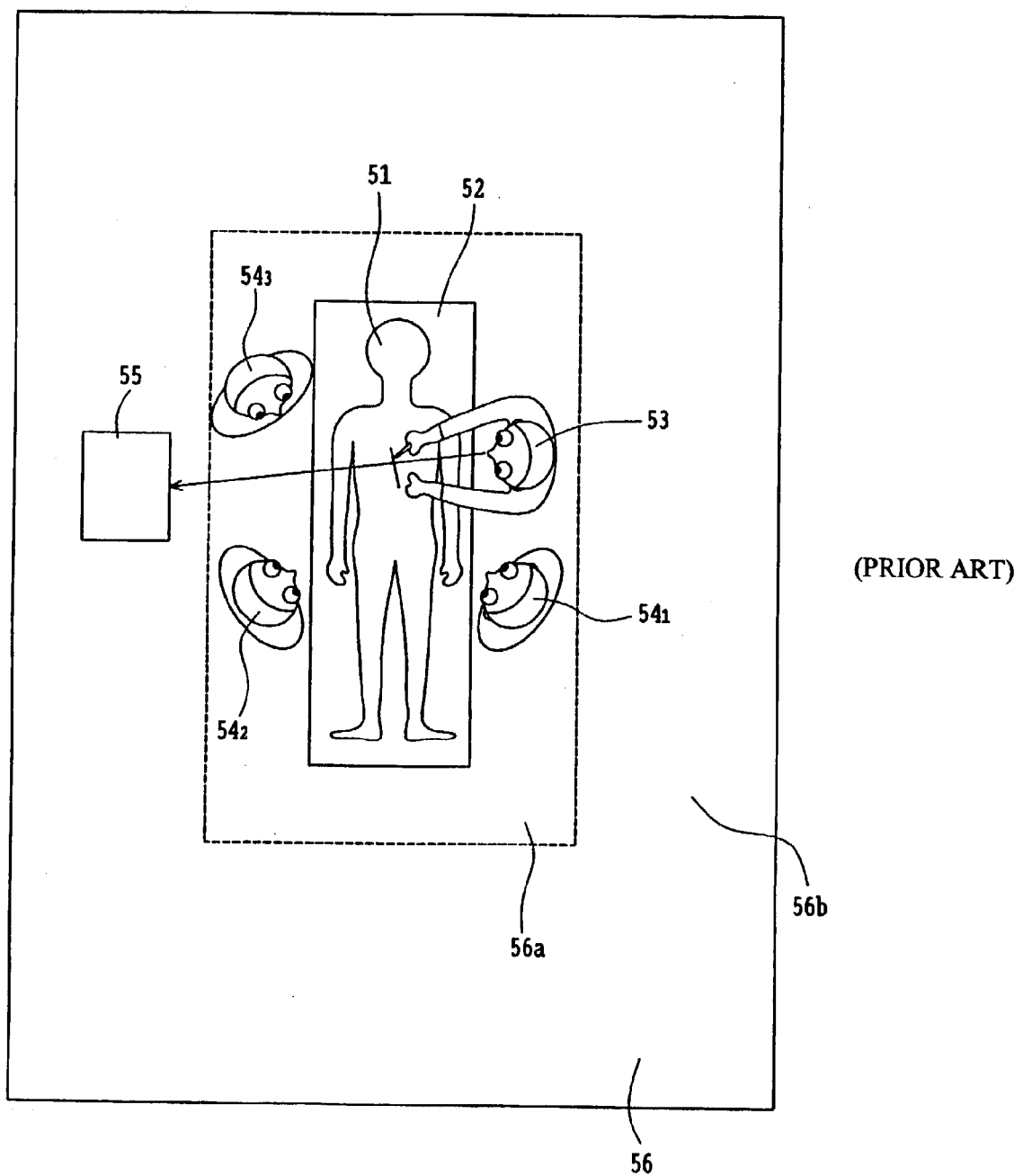
FIG. 32 is a conceptual drawing showing the positional relationship between a conventional image display device, the surgeons, and the patient in an operating room.

FIG. 31 illustrates a sixth example of a product that uses the observation apparatus according to the present invention, wherein the observation apparatus is a transmissive stereoscopic observation apparatus. In this case the supporting member 4 is attached to the ceiling in order to conserve space. Once again, the retaining and supporting member 6 is formed of retaining member 3 and supporting member 4, and the retaining member 3 is detachable from the supporting member 4 so as to allow it to be easily sterilized.

Moreover, the 3-D observation apparatuses shown in FIGS. 26–31 can be applied variously to serve as observation apparatuses of surgical microscopes, endoscopes, general display apparatuses for 3-D information images related to medicine, general display apparatuses for entertainment products such as game equipment using computers, and display apparatuses for 3-D images related to business-related 3-D images such as all types of 3-D CAD images. In addition, the composition shown as a reflective 3-D observation apparatus may be applied in a transmission arrangement, and vice-versa, by selecting an appropriate observation pupil forming means formed of a reflective or a transmissive imaging means, as required for a given arrangement. Examples of 3-D observation apparatuses that use a transmissive arrangement are shown in FIGS. 30 and 31.

According to the observation apparatus of the present invention, an observation apparatus can be provided which can be made smaller and lighter, can be positioned inside the clean area during surgery, and is of a type that the surgeon can view 3-D images without wearing special glasses for stereoscopic viewing. Furthermore, a bright image can be obtained, and a type of personal stereoscopic observation device can be provided whereby the degree of freedom in positions from which the observer's eyes can observe is great, the image is not distorted even if the eyes move, and 3-D viewing in comfortable observation postures is possible.

The invention being thus described, it will be obvious that the same may be varied in many ways. For example, a reflective liquid crystal or a DMD device may be used for the display device of the observation apparatus according to Embodiment 2 of the invention. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An observation apparatus comprising:
   two projection devices;
   a display panel;
   a retaining member for retaining said display panel; and
   a supporting member for supporting said retaining member and said two projection devices;
   wherein
      said two projection devices are each provided with an aperture, and are configured such that images are projected through the apertures onto said display panel;
      said display panel is provided with an image-forming element having positive optical power, said image-forming element being positioned in the vicinity of said display panel such that conjugate positions of said apertures are formed at pupil positions for observation; and
      said retaining member is provided with a retaining mechanism, said retaining mechanism being configured such that said display panel is detachably attachable to said supporting member so as to enable a sterilized display panel to be readily provided;
      said display panel comprises a Fresnel reflective plate that is made of a material that is suitable for reuse after undergoing a sterilization process of autoclaving or gamma ray irradiation, and a diffusive film which is made of a material that is not suitable for reuse after undergoing a sterilization process of autoclaving or gamma ray irradiation;
      said retaining member is detachable from said supporting member so as to allow the retaining mechanism to be sterilized; and
      said diffusive film is detachably attached to a surface of said Fresnel reflective plate so that the diffusive film may be removed after sterilization and use.

2. An observation apparatus according to claim 1, wherein at least one grasping member that enables said display panel to be repositioned without touching a display surface of said display panel is provided outside said display surface of the display panel.

3. An observation apparatus according to claim 1, wherein said two projection devices are covered with a drape that includes at least one transparent plate.

4. An observation apparatus according to claim 1, wherein said diffusive film is a transmission hologram.

5. An observation apparatus according to claim 1, wherein said diffusive film is a flexible member.

6. An observation apparatus comprising:
   two projection devices;
   a display panel formed of a Fresnel reflective plate that is made of a material that is suitable for reuse after undergoing a sterilization process of autoclaving or gamma ray irradiation, and a diffusive film which is made of a material that is not suitable for reuse after undergoing a sterilization process of autoclaving or gamma ray irradiation;
   a retaining member and a supporting member that, together, support said two projection devices and support and retain said display panel; and
   said diffusive film is detachably attached to a surface of said Fresnel reflective plate so that the diffusive film may be removed after sterilization and use;
   wherein
      said two projection devices are each provided with an aperture, and are configured such that images are projected through said apertures onto said display panel;
      said display panel is provided with an image-forming element having positive optical power, said image-forming element being positioned in the vicinity of said display panel such that conjugate positions of said apertures are formed at pupil positions for observation;
      said retaining member is provided with a retaining mechanism, said retaining mechanism being configured such that said display panel is detachably attachable to said supporting member so as to enable a sterilized display panel to be provided; and
      said retaining member is detachably attachable to said supporting member so as to allow the retaining member to be sterilized.

7. An observation apparatus according to claim 6, wherein said retaining member can withstand temperatures associated with autoclaving for sterilizing said retaining member without damaging said retaining member.

8. An observation apparatus according to claim 6, wherein at least one grasping member that enables said display panel to be repositioned without touching a display surface of said display panel is provided outside said display surface.

9. An observation apparatus according to claim 6, wherein said two projection devices are covered with a drape that includes at least one transparent plate.

10. An observation apparatus according to claim 6, wherein said diffusive film is a transmission hologram.

* * * * *